US012715560B2

(12) United States Patent
Sovran et al.

(10) Patent No.: US 12,715,560 B2
(45) Date of Patent: Aug. 25, 2026

(54) DARK ACTIVITY IDENTIFICATION

(71) Applicant: Windward LTD., Tel Aviv (IL)

(72) Inventors: Ido Sovran, Tel Aviv-Jaffa (IL); Hannah Danan Moise, Tel Aviv (IL); Noam Biberman, Tel Aviv-Jaffa (IL)

(73) Assignee: WINDWARD LTD., Tel Aviv (IL)

( * ) Notice: Subject to any disclaimer, the term of this patent is extended or adjusted under 35 U.S.C. 154(b) by 715 days.

(21) Appl. No.: 17/478,034

(22) Filed: Sep. 17, 2021

(65) Prior Publication Data

US 2023/0086883 A1 Mar. 23, 2023

(51) Int. Cl.

*B63B 49/00* (2006.01)
*B63B 79/10* (2020.01)
*G01C 21/20* (2006.01)
*G07C 5/00* (2006.01)
*G07C 5/02* (2006.01)

(52) U.S. Cl.

CPC .............. *B63B 49/00* (2013.01); *B63B 79/10* (2020.01); *G01C 21/203* (2013.01); *G07C 5/008* (2013.01); *G07C 5/02* (2013.01)

(58) Field of Classification Search

CPC ....... B63B 49/00; B63B 79/10; G01C 21/203; G07C 5/008; G07C 5/02; G07C 5/085; G08G 3/00
USPC .......................................................... 701/424
See application file for complete search history.

(56) References Cited

U.S. PATENT DOCUMENTS 10,399,650 B2 * 9/2019 Delay ...................... G08G 3/00
2014/0142845 A1 * 5/2014 Fueller ..................... G08G 3/00 701/484
2020/0184828 A1 * 6/2020 Mazor ..................... G06F 17/18

FOREIGN PATENT DOCUMENTS

EP 2610636 A1 7/2013
JP 2015036832 A 2/2015
KR 102143322 * 8/2020

OTHER PUBLICATIONS

Aubry et al., "Optimal Opponent Stealth Trajectory Planning Based on an Efficient Optimization techniques" IEEE , Transactions of Signal Processing, Nov. 2020,, pp. 1-14, REsearchGate GmbH , Berlin, Germany.*

(Continued)

*Primary Examiner* — Muhammad Shafi
(74) *Attorney, Agent, or Firm* — Myers Wolin, LLC

(57) ABSTRACT

A method, system and product comprising: obtaining location-reporting signals of a vessel indicating that the vessel was located at a first geographical position prior to a shutdown event and at a second geographical position after the shutdown event; determining a distance between the first and second geographical positions; determining an estimated time to travel the distance based on the location-reporting signals; comparing the estimated time to the duration of the shutdown event, to determine whether the vessel had sufficient time to perform a dark activity that is associated with a maritime event; generating a potential travel path from the first geographical position to the second geographical position, wherein the potential travel path comprises the maritime event; obtaining images that correspond to the duration of the shutdown event and to the potential travel path; and verifying that the maritime event occurred based on an analysis of the images.

18 Claims, 8 Drawing Sheets

(56) References Cited

OTHER PUBLICATIONS

Extended European Search Report issued for European Patent Application No. 22193298.1 dated Feb. 23, 2023.

Aubry et al., "Optimal Opponent Stealth Trajectory Planning Based on an Efficient Optimization Technique", IEEE Transactions on Signal Processing, Nov. 2020, pp. 1-14, ResearchGate GmbH, Berlin, Germany.

* cited by examiner

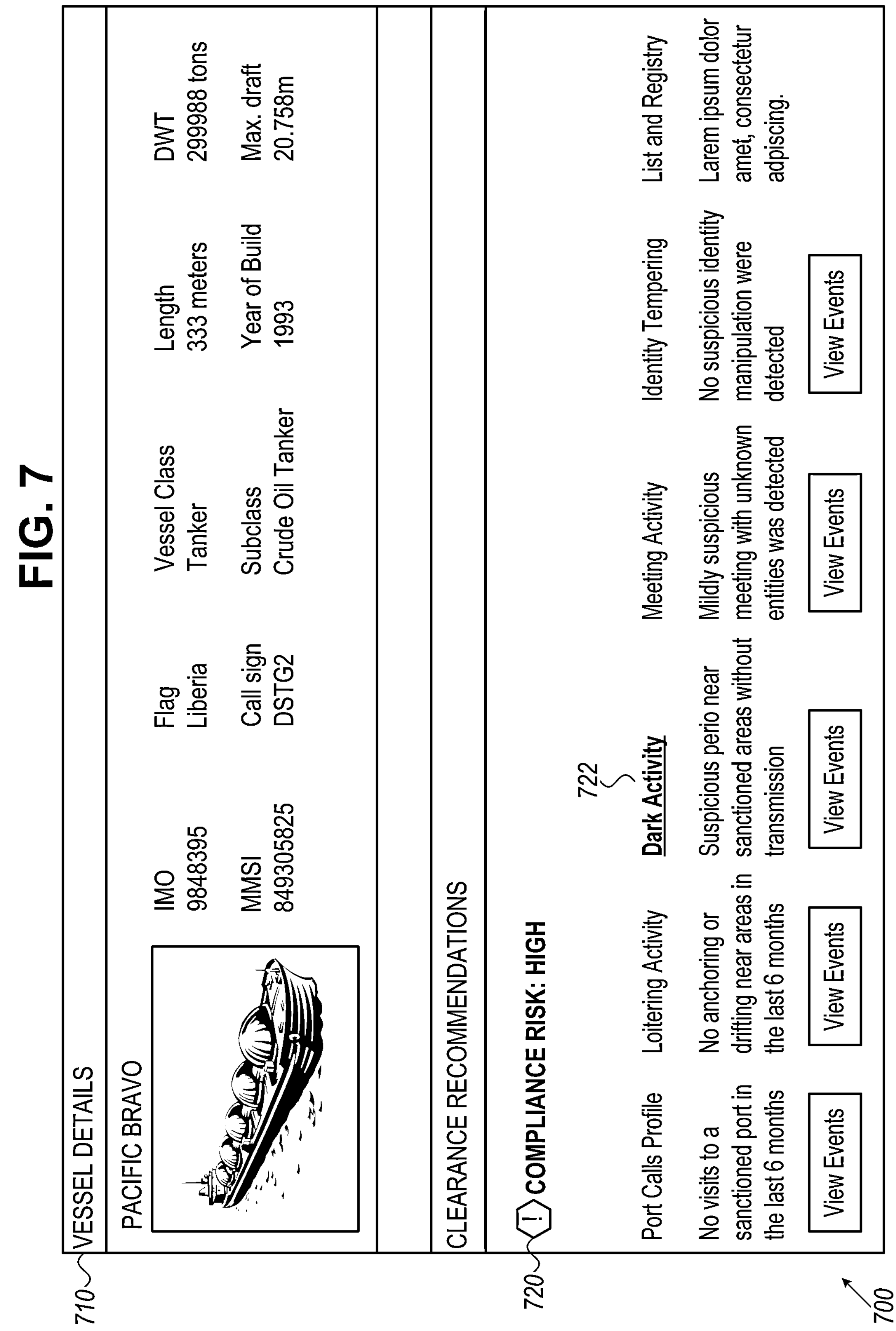

710 VESSEL DETAILS

PACIFIC BRAVO

IMO
9848395

Flag
Liberia

Vessel Class
Tanker

Length
333 meters

DWT
299988 tons

MMSI
849305825

Call sign
DSTG2

Subclass
Crude Oil Tanker

Year of Build
1993

Max. draft
20.758m

CLEARANCE RECOMMENDATIONS

720 COMPLIANCE RISK: HIGH

722

Port Calls Profile
No visits to a sanctioned port in the last 6 months
View Events Loitering Activity
No anchoring or drifting near areas in the last 6 months
View Events

Dark Activity
Suspicious perio near sanctioned areas without transmission
View Events Meeting Activity
Mildly suspicious meeting with unknown entities was detected
View Events Identity Tempering
No suspicious identity manipulation were detected
View Events List and Registry
Larem ipsum dolor amet, consectetur adpiscing.

BEHAVIORAL RISK INDICATORS

■ High Risk Events ☐ Medium Risk Events ▩ Low Risk Events

Dark Activity
Possible activity in sanctioned country during the transmission gap Related country
Iran

| Start | | End | | Duration | |
|---|---|---|---|---|---|
| 23/01/2021 08:15 | | 24/01/2021 18:36 | | 1d 10h 22m | |
| VOYAGE CONTEXT | | REPORTED DESTINATION | | REPORTED DRAFT | |
| Previous Port | Next Port | Before Event | After Event | Before Event | After Event |
| Khor Al Zubair (Iraq) | Umm Qasr (Iraq) | KAZ OPL | Umm Qasr | 9.8 | 7 |

| DARK ACTIVITY METRICS | VOYAGE CONTEXT | | | | |
|---|---|---|---|---|---|
| AIS Coverage | Previous Port | Distance | Speed | Calculated Time | Unaccounted Time |
| Standard | Khor Al Zubair (Iraq) | 0.229 nm | 3.2 kn | 4 minutes | 1d 10h 17m |

POSSIBLE PORT VISITS
2 ports are possible candidates

800

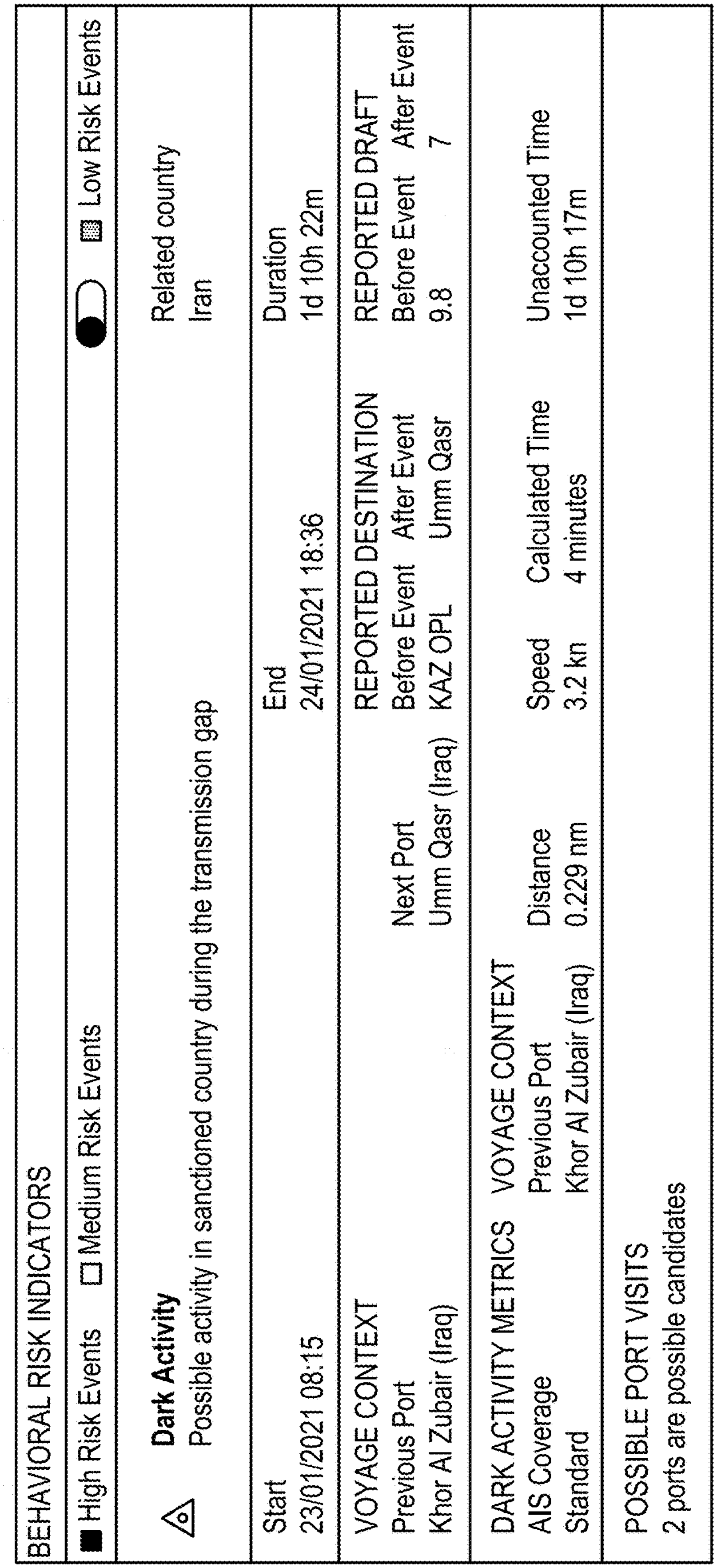

FIG. 8

DARK ACTIVITY IDENTIFICATION

TECHNICAL FIELD

The present disclosure relates to maritime data analysis in general, and to identifying dark activities based on maritime-related data, in particular.

BACKGROUND

Vessel tracking may be achieved through the use of the Automatic Identification System (AIS). Information provided by AIS equipment, such as identification, position, course, and speed, can be displayed on a screen or an Electronic Chart Display and Information System (ECDIS). AIS transmissions may allow maritime authorities to track and monitor vessel movements, geolocation, speed, or the like. AIS equipment integrates a standardized VHF transceiver with a positioning system such as a GPS receiver, with other electronic navigation sensors, such as a gyrocompass or rate of turn indicator. Vessels fitted with AIS transceivers can be tracked by AIS base stations located along coast lines or, when out of range of terrestrial networks, through satellites that are fitted with AIS receivers. In some cases, AIS equipment may refrain from transmitting AIS signals, intentionally or unintentionally.

BRIEF SUMMARY

One exemplary embodiment of the disclosed subject matter is a method comprising: obtaining location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event; identifying the shutdown event, wherein the shutdown event indicates that the vessel ceased to provide the location-reporting signals for a duration of the shutdown event; determining a distance between the first geographical position and the second geographical position; determining an estimated time to travel the distance based on the location-reporting signals of the vessel; comparing the estimated time to the duration of the shutdown event, to determine whether the vessel had sufficient time to perform a dark activity that is associated with a maritime event, wherein the maritime event comprises a port event or a Ship-To-Ship (STS) event; in response to determining that the vessel had sufficient time to perform the dark activity, generating a potential travel path from the first geographical position to the second geographical position, wherein the potential travel path comprises the maritime event; obtaining images that correspond to the duration of the shutdown event and to the potential travel path; and verifying that the maritime event occurred based on an analysis of the images, wherein said analysis identifies the maritime event by identifying an object potentially representing the vessel in the images.

Optionally, the method comprises determining that the maritime event comprises the STS event based on identifying a second shutdown event of a second vessel, wherein the second shutdown event has a second duration that overlaps at least partially with the duration of the shutdown event, wherein the second shutdown event has a second geographical zone that overlaps at least partially with a geographical zone of the shutdown event.

Optionally, the geographical zone of the shutdown event defines a maximal distance to which the vessel can travel in any direction during the shutdown event.

Optionally, the method comprises determining that the maritime event comprises the port event based on identifying a port that is within a geographical zone of the shutdown event, wherein the port has sufficient resources to handle the vessel at a time of arrival of the vessel to the port according to the potential travel path.

Optionally, the method comprises comparing the distance to a distance threshold, and determining, prior to said verifying, that the distance overpasses the distance threshold.

Optionally, the location-reporting signals comprise Automatic Identification System (AIS) transmissions from the vessel before and after the shutdown event.

Optionally, the potential travel path is generated based on historic data comprising multiple vessels' paths in a geographical zone of the shutdown event, historic data regarding a behavior of the vessel, or the like.

Optionally, the maritime event comprises the port event, wherein the potential travel path is generated based on historic data regarding a port with which the port event is associated, data regarding a state of the port during the shutdown event, or the like.

Optionally, the maritime event comprises the STS event, wherein the STS event is an event between the vessel and a second vessel, wherein the potential travel path is generated based location-reporting signals regarding the second vessel.

Optionally, the images are selected from satellite images; drone images; aerial images, or the like.

Another exemplary embodiment of the disclosed subject matter is a computer program product comprising a non-transitory computer readable storage medium retaining program instructions, which program instructions when read by a processor, cause the processor to: obtain location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event; identify the shutdown event, wherein the shutdown event indicates that the vessel ceased to provide the location-reporting signals for a duration of the shutdown event; determine a distance between the first geographical position and the second geographical position; determine an estimated time to travel the distance based on the location-reporting signals of the vessel; compare the estimated time to the duration of the shutdown event, to determine whether the vessel had sufficient time to perform a dark activity that is associated with a maritime event, wherein the maritime event comprises a port event or a Ship-To-Ship (STS) event; in response to determining that the vessel had sufficient time to perform the dark activity, generate a potential travel path from the first geographical position to the second geographical position, wherein the potential travel path comprises the maritime event; obtain images that correspond to the duration of the shutdown event and to the potential travel path; and verify that the maritime event occurred based on an analysis of the images, wherein said analysis identifies the maritime event by identifying an object potentially representing the vessel in the images.

Yet another exemplary embodiment of the disclosed subject matter is a system comprising a processor and coupled memory, the processor being adapted to: obtain location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event; identify the shutdown event, wherein the shutdown event indicates that the vessel ceased to provide the location-reporting signals for a duration of the shutdown event; determine a distance between the first geographical position and the second geographical position; determine an estimated time to travel the distance based on the location-reporting signals of the vessel; compare the estimated time to the duration of the shutdown event, to determine whether the vessel had sufficient time to perform a dark activity that is associated with a maritime event, wherein the maritime event comprises a port event or a Ship-To-Ship (STS) event; in response to determining that the vessel had sufficient time to perform the dark activity, generate a potential travel path from the first geographical position to the second geographical position, wherein the potential travel path comprises the maritime event; obtain images that correspond to the duration of the shutdown event and to the potential travel path; and verify that the maritime event occurred based on an analysis of the images, wherein said analysis identifies the maritime event by identifying an object potentially representing the vessel in the images.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 7 shows a schematic illustration of an exemplary scenario, in accordance with some exemplary embodiments of the disclosed subject matter; and FIG. 8 shows a schematic illustration of an exemplary report, in accordance with some exemplary embodiments of the disclosed subject matter.

DETAILED DESCRIPTION

Figure 1:
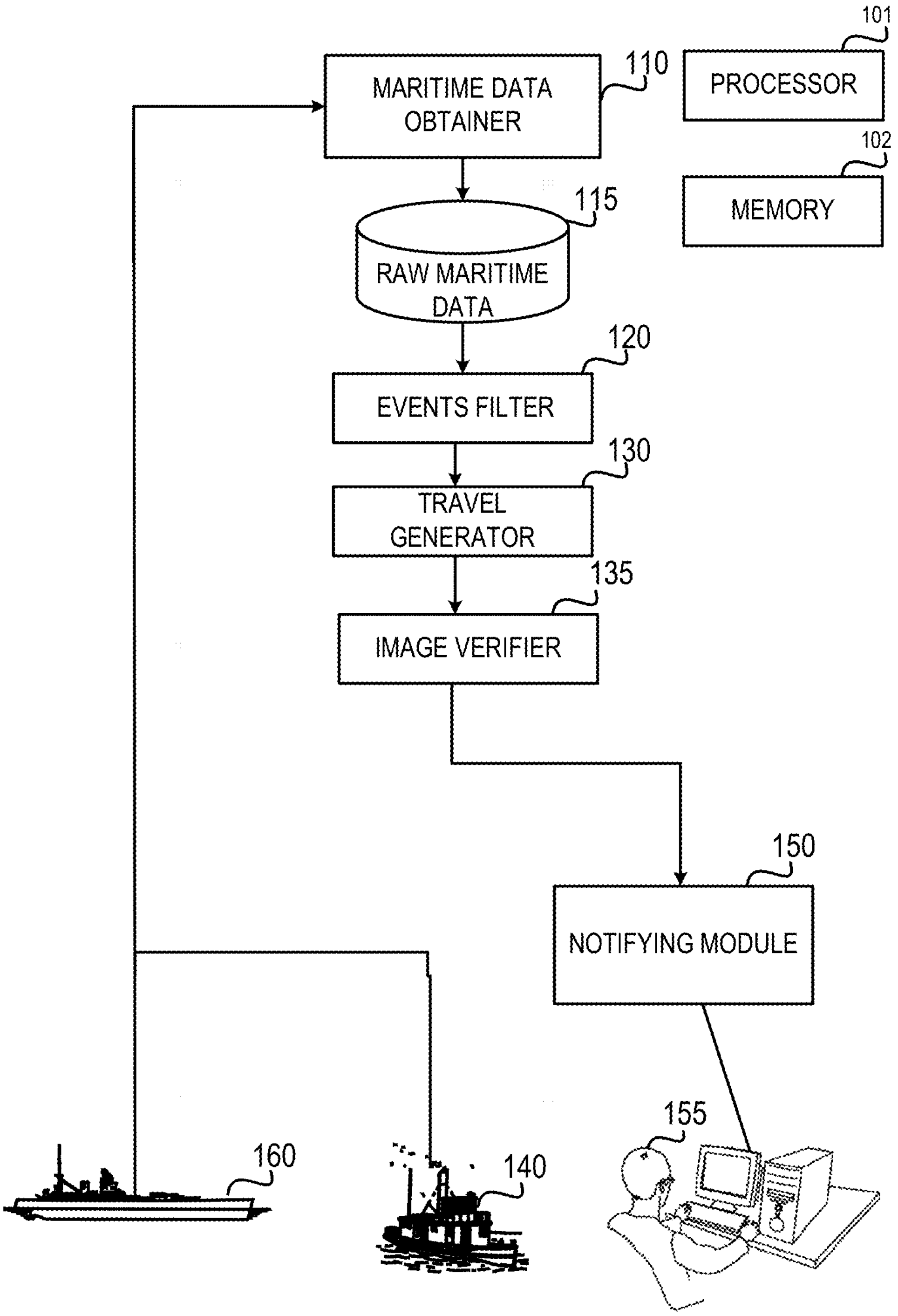
FIG. 1 shows a schematic illustration of an exemplary system, in accordance with some exemplary embodiments of the disclosed subject matter.

One technical problem dealt with by the disclosed subject matter is to enable non-criminal actors, such as energy traders, financial institutions and bunkering services, to determine which vessels are safe to do business with, in a secure way that protects them from involuntary involvement in criminal activities and protects them from associated potentially punitive costs of failing counterparty due-diligence. In some exemplary embodiments, various criminal maritime activities such as illegal fishing, sanctions violation, pirating, drug trafficking, or the like, may be banned by countries, organizations, or the like. In some exemplary embodiments, criminal actors may attempt to disguise their criminal activity, such as by turning off their Automatic Identification System (AIS) equipment. In some exemplary embodiments, organizations may seek to minimize the risk of becoming mired in outlawed activity such as maritime sanctions evasion or entering into relationships with parties or vessels who are at high risk of becoming prohibited sanctions targets.

A naïve solution may comprise screening vessels and fleets prior to performing transactions therewith. In some exemplary embodiments, vessels and counterparties may be screened against lists of restricted parties and vessels from the Office of Foreign Assets Control (OFAC), the European Union (EU), United Kingdoms (UK), the United Nations (UN), along with organization-specific red-flag parameters such as the use of flags of convenience, a lack of information regarding beneficial ownership, prior port calls in sanctioned countries, or the like. In case the review process clears a vessel, e.g., if the vessel does not appear in lists of restricted parties and red-flag parameters are not matched, the transactions may proceed.

In some exemplary embodiments, the naïve solution may have one or more drawbacks. In some exemplary embodiments, advisories make it clear that compliance with the naïve method is not sufficient, at least since it ignores data on vessel behavior that may be commercially available and may be highly indicative of sanctions evasion risk. In some exemplary embodiments, the Office of Foreign Asset Control (OFAC) organization expects all parties involved in maritime transactions, including energy traders, banks and bunkering service providers, to update their compliance controls to account for specific types of vessel behaviors, beyond past port calls in sanctioned countries, which indicate criminal behavior such as sanctions evasion that have taken place by the vessel. In some exemplary embodiments, the types of vessel behaviors that need to be taken into account include Ship-to-Ship (STS) transfers, dark activity, identity tampering, or the like.

Another technical problem dealt with by the disclosed subject matter is to perform in-depth behavioral analysis in order to screen for suspected maritime criminal offences, e.g., automatically. In some exemplary embodiments, in-depth behavioral analysis may be applied to identify suspected sanctions evasion, or other maritime criminal offences, prior to performing transactions with a vessel. In some exemplary embodiments, it may be almost impossible to manually apply in-depth behavioral analysis to maritime data in a timely fashion and without significantly increasing resources and costs.

In some exemplary embodiments, performing in-depth behavioral analysis of maritime data may be challenging. In some exemplary embodiments, vessels may communicate their locations using AIS messages, Satellite-AIS (S-AIS) communications, Very High Frequency (VHF) Data Exchange Systems (VDES), Vessel Monitoring Systems (VMS), satellite-based phones, or the like. In some exemplary embodiments, these communication means may be used in order to report the vessels' positions, unique vessel identification numbers, course over ground, speed, direction, or the like. In some exemplary embodiments, an AIS transceiver may periodically generate AIS messages comprising a Maritime Mobile Service Identity (MMSI) number of the vessel, as well as other parameters such as navigation status, rate of turn (right or left), speed over ground (e.g., from 0 to 102 knots), positional accuracy, true heading, or the like. The MMSI of the vessel may comprise an identification number of the vessel, which is potentially unique, although, at times, it is not. The navigation status may comprise a status of travel such as "at anchor", "under way using engine(s)", "not under command", or the like.

In some exemplary embodiments, AIS messages may utilize transceivers on ships, which may integrate a VHF transceiver with a positioning system such as a Global Positioning System (GPS) receiver, with other electronic navigation sensors, such as a gyrocompass or rate of turn indicator. In order to make the most efficient use of the bandwidth available, vessels that are anchored or moving slowly may transmit signals less frequently than those that are moving faster or are maneuvering. The update rate may range from 3 minutes for anchored or moored vessels, to 2 seconds for fast moving or maneuvering vessels. For example, the information may be sent every 2 to 10 seconds while underway, and every 3 minutes while a vessel is at anchor.

In some exemplary embodiments, ground stations may accumulate raw maritime data, which may refer to raw data representing at least geolocation of vessels at respective timestamps. In some exemplary embodiments, vessels fitted with AIS transceivers may be tracked by AIS base stations located along coast lines, or, when out of range of terrestrial networks, through satellites that are fitted with AIS receivers. In some exemplary embodiments, raw maritime data may comprise AIS messages which indicate geolocation of the transmitting vessel. Such messages may also be referred to as "AIS blips", "AIS transmissions", or the like. It is noted, however, that the disclosed subject matter is not limited to AIS messages and may be implemented with respect to additional or alternative sources of raw maritime data. In some exemplary embodiments, gathering and analyzing information on the multitude of maritime vessels around the world may be challenging since maritime vessels come in different types, have different owners and operators, serve different purposes that may even change in time, may be bound to different regulations, policies or national laws depending on the circumstances, and use different machinery, hardware and software for communication purposes.

Yet another technical problem dealt with by the disclosed subject matter is to provide an analysis of the raw maritime data. In some exemplary embodiments, it may be desired to identify illicit affairs in real time, and provide warnings to appropriate entities regarding the identified activity, such as in order to enable organizations to disassociate from the violating ship. Approaches that require substantive computation and memory resources may not be feasible or applicable in a reasonable time. In some exemplary embodiments, analyzing information on the multitude of maritime vessels around the world may be challenging since behavior of vessels may change over time due to local and global conditions, e.g. economic supply and demand of commodities, fuel consumption preferences, weather, dangers at sea, regulations, dynamic adaptations of routes at sea, changes in fish distribution, and even melting of icebergs. Some vessels (e.g. Floating Production Storage and Offloading) may behave like a floating buoy, some may appear to be onshore (e.g. for repairs in a shipyard), and some may change behavior in time depending on circumstances.

Furthermore, some information on vessels may be absent or otherwise corrupted due to non-malicious reasons, some may be absent or otherwise manipulated maliciously, and some vessels make occasional efforts not to disclose part or all of its information or otherwise manipulate information, e.g. military vessels, vessels reporting wrong draught numbers for various motives, vessels undergoing illegal activities, or the like. In some exemplary embodiments, corrupted data, such as due to non-deliberate corruption or deliberate malicious intent, may reduce or increase the quantity of available data and adversely affect accuracy of any processing performed. It may be desired to analyze the maritime data and identify therein indications of illicit affairs.

Yet another technical problem dealt with by the disclosed subject matter is to identify potential dark activities of a vessel or fleet. In some exemplary embodiments, a dark activity may refer to a vessel intentionally ceasing its AIS transmissions or other location-reporting means in order to perform an activity without overtly disclosing it to the public, performing the activity, and re-operating the location-reporting means thereafter. In some cases, dark activity may be performed in a suspicious context, such as around waters or ports of concern, in close proximity to vessels known to be sanctioned, or the like. In some exemplary embodiments, such behavior may indicate criminal activity such as illicit STS transfers, visiting prohibited or suspicious ports, or the like. It is noted that maritime vessels, as opposed to cars, aircrafts, and other vehicles, are able to continue on their voyage without electricity or functioning instruments. In some cases, vessels may deliberately shut down instruments, such as the AIS equipment in order to avoid detection during illicit activities such as a drug trafficking. Similar activity in non-maritime transportation means is improbable and, in many cases—impossible.

Yet another technical challenge may be verify a dark activity, e.g., with a high confidence score. In some exemplary embodiments, it may be desired to provide evidence or verification of a potential dark activity.

One technical solution of the disclosed subject matter includes obtaining an indication of a shutdown event of a vessel and analyzing the event to determine whether or not it comprises a dark activity. In some exemplary embodiments, shutdown events may be obtained, or determined, such as by analyzing raw maritime data of location-reporting signals and identifying therein a shutdown event. In some exemplary embodiments, location-reporting signals associated with shutdown events may be analyzed to identify whether or not the event was intentional, to identify probable paths or actions taken by the disappearing vessel during the shutdown event, to perform verification thereof, or the like.

In some exemplary embodiments, a shutdown event may refer to an event in which location-reporting signals such as AIS transmissions of a vessel have ceased for at least a defined timeframe, such as five hours, ten hours, one day, a week, or the like, causing the vessel to effectively disappear from the ground station's monitoring center during the shutdown event. In some exemplary embodiments, occurring shutdown events may be identified based on missing location-reporting signals such as AIS transmissions for at least a defined timeframe. In some exemplary embodiments, during a shutdown event, a vessel may disappear from a screen or an Electronic Chart Display and Information System (ECDIS) that is configured to display information provided by AIS equipment, such as the position of the vessel, its speed, or the like.

In some exemplary embodiments, shutdown events may be identified by analyzing raw maritime data, e.g., from location-reporting signals, and determining that the raw maritime data is exclusive of data for a vessel at the time of the shutdown event. In some exemplary embodiments, the location-reporting signals may comprise AIS transmissions or other location indications from the vessel before and after the shutdown event, whereby enabling to identify route segments of the vessel prior to the shutdown event and after the event, but not during the event. In some exemplary embodiments, location-reporting signals may be obtained periodically from maritime vessels that function properly. In some exemplary embodiments, in case location-reporting signals of a vessel have ceased for a standard period, such as for 3 minutes while being at anchor, the signal loss may not be considered a shutdown event, e.g., since vessels may be configured to provide MS transmissions every 3 minutes while a vessel is at anchor, this being the accepted behavior. In some exemplary embodiments, a classifier may be configured to set a minimal shutdown threshold for classifying a signal loss as a shutdown event, e.g., based on commonly used transmission periods.

In some exemplary embodiments, raw maritime data may comprise faulty data. For example, AIS ship identifier may be updated during the voyage. Hence, analysis may be performed to ensure that the lack of new AIS reporting messages for a given ship is the outcome of a shutdown and not of an identifier update. Similarly, call signs of ships may be updated on the fly. As another example, there may be multiple ships using the same AIS identifier. Analysis may be performed to separate AIS reports of each such vessel, to identify whether one of the ships has performed a shutdown event. Such analysis may be based on AIS reported location, metadata of the AIS transmissions, other non-location fields in the AIS transmissions, other location-reporting signals, or the like.

In some exemplary embodiments, the shutdown events may comprise an intentional shutdown of the AIS signals, or an unintentional shutdown such as a shutdown of the AIS signals due to mistaken or technical causes. In some exemplary embodiments, during a dark activity, ships may perform an intentional shutdown of their communication messages, their location reporting means, their AIS transceivers, or the like. In some exemplary embodiments, dark activities may comprise activities performed during a shutdown event in designated areas such as in sanctioned ports, territorial waters of sanctioned countries, performing cargo transfers with sanctioned ships, transferring sanctioned or illicit cargo, or the like.

In some exemplary embodiments, upon obtaining an indication of a shutdown event of a vessel, location-reporting signals of the vessel may be obtained, accumulated, analyzed, or the like. In some exemplary embodiments, the location-reporting signals may indicate that the vessel ceased to provide location-reporting signals for a duration of the shutdown event. In some exemplary embodiments, the location-reporting signals may comprise AIS transmissions, or any other location indications, from the vessel before and after the shutdown event. In some exemplary embodiments, the location-reporting signals may indicate one or more geographical positions of the vessel before the shutdown event, after the shutdown event, or the like. In some exemplary embodiments, first signals of the vessel prior to the shutdown event may indicate that the ship was located or positioned at a first geographical position, e.g., a disappearing point, prior to the shutdown event, while second signals of the vessel after the shutdown event may indicate that the ship was located or positioned in a second geographical position, e.g., a re-appearing point, after the shutdown event.

In some exemplary embodiments, in order to determine whether or not the event comprises a dark activity, one or more a priori filters may be applied to the event. In some exemplary embodiments, in order to perform dark activities in designated areas, the violating vessel may need to sail for a significant amount of time without providing any AIS transmissions, such as for a dark activity threshold of 8 hours, or any other defined timeframe or threshold, which may suffice for cooperating and performing cargo transfer, performing a port call, or the like. In some exemplary embodiments, a duration of the shutdown event may be compared to a minimum duration threshold, indicating whether the duration of the event comprises a sufficient timeframe that enables the vessel to perform a dark activity. In some exemplary embodiments, the defined threshold may be set to comprise a timeframe that enables to perform a significant action such as a criminal activity, transfer of cargo between ships, or the like, in minimal time. In some exemplary embodiments, the threshold may be applied to shutdown events, in order to filter out shutdown events that could not have been dark activities due to short durations.

In some exemplary embodiments, in order to filter out legal or unintentional events, one or more calculations may be performed. In some exemplary embodiments, a distance between the point of disappearance, e.g., the first geographical position, and the point of re-appearance, e.g., the second geographical position, may be determined, calculated, or the like. In some exemplary embodiments, the distance may be compared to a distance threshold, e.g., in order to determine that the distance overpasses the distance threshold. For example, in case the vessel stayed in the same location, without traveling, a dark activity could not have been performed. In some cases, in case the first and second geographical positions include a same or nearby (e.g., below a threshold) location within a certain port, one or more techniques may be used to verify that the vessel has not traveled and returned to the same location during the shutdown event. For example, port data may be accumulated to identify whether they indicate that the vessel has exited and returned to the port, metadata regarding technical limits on such actions may be used, imagery of the port may be correlated to the vessel, or the like. In case the first and second geographical positions include a same or nearby location in the open sea, in order to verify that the vessel has not traveled and returned to the same area, an image capturing the reported area during the shutdown event may be analyzed to identify whether or not the vessel is depicted by the image.

In some exemplary embodiments, an estimated time to travel the distance may be determined based on the location-reporting signals of the vessel, such as speed indications thereof, based on common maritime paths in the area, based on common timeframes for traveling in the area, or the like. In some exemplary embodiments, the estimated time to travel the distance may be compared to the duration of the shutdown event, to identify whether or not the times corresponds, whether the ratio between the times is low or high, or the like. In some exemplary embodiments, the estimated time to travel the distance may be compared to the duration of the shutdown event, such as in order to determine whether the vessel had sufficient time to perform a dark activity that is associated with a maritime event after sailing the distance. In some exemplary embodiments, the maritime event may comprise a dark event of interest such as a port event or an STS event. In some exemplary embodiments, in order to perform a dark activity of interest, the vessel may need sufficient time to perform a dark activity in addition to the traveling time from the disappearing point to the re-appearing point. In some exemplary embodiments, based on the comparison between the estimated time to travel the distance and the duration of the shutdown event, an excess time duration of the vessel may be determined (e.g., a number of excess hours).

In some exemplary embodiments, the vessel may travel at a first route segment (including the disappearing point) with a first averaged or measured speed prior to the shutdown event, and at a second route segment (including the re-appearing point) with a second averaged or measured speed after the shutdown event. The speeds before and after the event may be identical in average, different in average, have a same of different standard deviation, or the like. In some exemplary embodiments, an estimated time to travel the distance may be calculated according to the first averaged speed of the first route segment, the second averaged speeds of the second route segment, a deviation thereof, a combination thereof, a different speed derived based on the first or second speeds, or the like, and the excess time duration of the vessel may be determined based on the estimated time to travel the distance.

In some exemplary embodiments, the excess time duration may be compared to a threshold, to determine whether or not it suffices for performing a dark activity. For example, in case the excess duration is negative, e.g., indicating that the ship increased its speed during the shutdown event, or in case the excess duration is relatively low, e.g., 0.25 hours or below another threshold, there may be insufficient time for the ship to perform any dark activity, and such an option may be removed, become invalid, or the like. In case the excess duration is lesser than the threshold, the event may be filtered out and may not be analyzed further, may be marked as legal, or the like. In case the excess duration is equal or greater than the threshold, the event may be analyzed further, estimated to be a dark activity with an increased probability, or the like.

In some exemplary embodiments, in response to determining that the vessel had sufficient time to perform the dark activity, one or more potential traveling paths from the first geographical position to the second geographical position may be generated. In some exemplary embodiments, a potential travel path may be generated to comprise at least one maritime event, e.g., a port docking event, a Ship-To-Ship (STS) event, or the like. In some exemplary embodiments, a potential travel of a disappearing vessel may comprise a potential path of the vessel including static stops during which cargo can be transferred. In some exemplary embodiments, potential travel paths of the disappearing vessel may comprise potential paths and maritime events such as docking at a port, performing STS transfer operations with a second vessel, or the like. In some exemplary embodiments, STS transfer activities may comprise an event between the vessel and a second vessel such as ship refueling events (bunkering), logistics events such as leaving or entering a port or channel using tugboat assistance, cargo-to-cargo events, or the like. In some cases, STS transfers can be performed in order to conceal the origin or destination of the transferred cargo.

In some exemplary embodiments, a predictor may predict potential travel routes of the disappearing vessel. In some exemplary embodiments, potential travel routes may be determined by creating feasible travel options for disappearing vessels. In some exemplary embodiments, the potential travel paths may be predicted based on an environment model, vessel paths derived from AIS transmissions from the target ship prior the shutdown event or after the shutdown event, vessel paths derived from AIS transmissions from nearby ships, historic path data in the area, historic path data of nearby ships, a context of the event, or the like. In some exemplary embodiments, in case a second shutdown event of a second vessel is identified, and is estimated to be cooperated with the first vessel, such as in case the second shutdown event has a duration that overlaps at least partially with the duration of the shutdown event, has a second geographical zone that overlaps at least partially with the geographical zone of the first shutdown event, or the like, the predictor may predict potential travel paths of the disappearing vessel based on data associated with the second vessel, such as past travel paths thereof.

In some exemplary embodiments, maritime events and paths may be generated to be within a geographical zone of the shutdown event. In some exemplary embodiments, the geographical zone may define a maximal distance to which the vessel can travel in each direction, during the shutdown event. In some exemplary embodiments, although the location of the disappearing vessel may be uncertain during the shutdown event, its path possibilities may be limited within a geographical boundary that may comprise a maximal distance that the vessel is able to travel in each direction within the timeframe of the event. In some exemplary embodiments, the geographical zone may be determined based on the timeframe of the event, in combination with estimated traveling capabilities of the vessel such as maximum maritime capabilities that were historically captured for the vessel, a maximal speed of the vessel's type, weight, or model, environmental parameters that may affect the speed of the vessel such as wave heights during the event in the disappearing zone, technical limits, historic averaged speeds of vessels in the area, or the like.

In some exemplary embodiments, within the geographical zone, potential maritime events during which the vessel may be enabled to transfer oil, banned cargo, weapons, merchandise, or any other commodity to a third party, may be identified. In some exemplary embodiments, potential transfer events may comprise port docking events, in which the vessel may perform a port call, dock in a port that may or may not be a recognized port, or the like. In some exemplary embodiments, potential transfer events may comprise STS events, in which the vessel may cling to another vessel in any open sea area and transfer commodities therewith. In some exemplary embodiments, during an STS event, cargo may be transferred between seagoing ships positioned alongside each other, either while stationary or underway. In some cases, an STS event may be performed in the midst of sea, near a port such as in order to transfer cargo to a small cargo boat near the port, or the like. In some exemplary embodiments, STS events may be cooperated with another vessel that may or may not perform a shutdown of its AIS transmissions as well, e.g., in overlapping time and area.

In some exemplary embodiments, a potential travel path of the vessel may be generated based on historic data comprising multiple vessels' paths in the geographical zone, historic data regarding a behavior of the vessel, historic data regarding a behavior of vessels from a same type as the vessel, real time data from multiple vessels in the geographical zone that is obtained during the shutdown event, technical constraints on a travel duration and speed of the potential travel path, or the like.

In some exemplary embodiments, in case the maritime event is estimated to comprise an STS event, the potential travel path of the vessel may be generated based on location-reporting signals (e.g., AIS signals) regarding a second vessel with which the STS event is performed, historic data regarding the second vessel, location-reporting signals obtained from the second vessel, or the like. In some exemplary embodiments, an estimated maritime event may be determined to comprise an STS event based on identifying a partner for performing an STS transfer, e.g., a nearby ship that became stationary for a long period of time, a nearby ship that incurred a shutdown event in corresponding times, or the like. In some exemplary embodiments, a second shutdown event of a second vessel may be identified, with a second duration that overlaps at least partially with the duration of the shutdown event. In some exemplary embodiments, the second shutdown event may be required to be within a second geographical zone that overlaps at least partially with the geographical zone of the first vessel. In some exemplary embodiments, the second vessel may comprise a sanctioned vessel, a vessel reporting a flag of a sanctioned country, or the like.

In some exemplary embodiments, in case the maritime event is estimated to comprise a port docking event, the potential travel path of the vessel may be generated based on historic data regarding a port with which the port event is associated, data obtained from the port during the shutdown event such as an availability status of the port, data regarding a state of the port during the shutdown event, or the like. In some exemplary embodiments, the maritime event may be determined to comprise a port event based on identifying a port that is within the geographical zone of the shutdown event, e.g., a sanctioned port, a port associated with a sanctioned entity, an unreported port, or the like. In some exemplary embodiments, the maritime event may be determined to comprise a port event associated with a specific port in case the port is determined to have sufficient resources to handle the vessel at a time of arrival of the vessel to the port according to the potential travel path. In some exemplary embodiments, in order for the maritime event to be performed within the port, the port may need be available to handle the vessel during the shutdown event, such as to have sufficiently deep water, to have sufficient space, have sufficient human resources, or the like.

In some exemplary embodiments, in order to filter out shutdown events that are legal, unsuspicious, or the like, shutdown events may only be processed in case an association of the vessel to a sanctioned entity is identified, e.g., by determining that the potential travel path travels through territorial water of a sanctioned country, determining that an STS event is performed with a sanctioned vessel, determining that the port event is performed in a sanctioned port, or the like. Alternatively, any other filtering heuristics or constraints may be used.

In some exemplary embodiments, images that correspond to the duration of the shutdown event and to a potential travel path may be obtained. In some exemplary embodiments, the images may include satellite images, drone images, radar images, aerial photography, spatial-temporal images of the area, or the like. In some exemplary embodiments, the images may be selected in case they correspond to a time of the shutdown event, to a geographical zone of the shutdown event, to a timeframe of the potential travel path, or the like. In some exemplary embodiments, the images may be selected to comprise images depicting geographical areas within the geographical zone of the vessel. In some exemplary embodiments, the images may be captured from areas and times that correspond to potential travel paths of the vessels and their estimated timelines.

In some exemplary embodiments, the images may be utilized to verify that the maritime event occurred, and to determine an actual occurrence of an estimated maritime event based on analysis of the images. In some exemplary embodiments, the image analysis may be configured to identify the maritime event in an image by identifying a depicted object in the image potentially representing the vessel. In some exemplary embodiments, vessels may be identified using images in which ships are depicted, maritime objects are detected, or the like. Additionally or alternatively, maritime events may be verified or matched against Radio Frequency (RF) triangulation data, which may enable to detect a location of a missing vessel based on monitored RF signals that may be emitted from the vessel.

In some exemplary embodiments, the image analysis stage may match the images against maritime events indicated by potential travel routes of the vessel such as docking inside a feasible port, performing a feasible seagoing transferring event, or the like. In some exemplary embodiments, images that correspond to areas of interest and timelines of the potential travel paths, their maritime events, or the like, may be analyzed to identify ships or vessels therewithin. In some cases, areas of interest may comprise areas in which the vessel is estimated to perform an activity with a confidence score that complied with a threshold. In some exemplary embodiments, images may be selected to be analyzed in case they are captured at an estimated time of a static maritime event, e.g., a port event, an STS event, or the like. In some exemplary embodiments, the images may be selected to comprise images that were captured during a static period, e.g., when docking inside the port, or while transferring goods during an STS activity. In some exemplary embodiments, in case a generated travel of a vessel is estimated to comprise multiple maritime events, each event may be verified independently with corresponding images.

In some exemplary embodiments, computer vision techniques, or any other image analysis techniques, may be used to analyze images that depict areas of interest such as areas in which the vessel is estimated to perform an STS activity or docking activity in one of the potential travel paths. In some exemplary embodiments, computer vision techniques may be used to identify images with ships, with STS patterns, or the like. In some exemplary embodiments, even in case of low resolution satellite images, computer vision techniques may enable to provide basic entity classification and object recognition. In some exemplary embodiments, identified ships in selected images may be classified according to their vessel type, properties thereof such as the ship's weight, geographical zone, activity, or the like, e.g., using extracted data, using computer vision techniques, or the like. In some exemplary embodiments, using computer vision methods, a specific identification of a depicted ship may not always be feasible. Instead, such methods may enable to perform image classification, and identify one or more properties of depicted objects. In some exemplary embodiments, an STS meeting may be recognized by identifying butterfly-like patterns of two ships positioned alongside each other, by identifying a pattern of travel that corresponds to a "courtship dance" of ships, or the like.

In some exemplary embodiments, upon identifying an image that matches an estimated event, extracted attributes from the image may be utilized to adjust parameters of the associated travel. In some exemplary embodiments, identified properties may comprise spatial data, draft, or the like. In some exemplary embodiments, extracted attributes from the image may be matched against a retained database (DB) with ship profiles, to classify the depicted ships according to attributes in the ship profiles that correspond to the extracted attributes. In some exemplary embodiments, in order to verify that a depicted ship may correspond to the missing vessel, the extracted attributes may be matched to a retained profile of the ship, the ship type, or the like, as well as other ship profiles, to identify which ship profile matches to the extracted attributes of the depicted ships.

In some exemplary embodiments, a maritime event may be classified to a logistics event, a maintenance event, or a cargo-to-cargo event, based on at least one image depicting the maritime event, attributes extracted therefrom, or the like. In some exemplary embodiments, extracted attributes from the image may be utilized in order to classify the type of the event. For example, in case the image depicts a bunkering ship positioned along a second vessel that matches the missing vessel's type, the event may be classified as a bunkering event. In some exemplary embodiments, a bunkering event may be typically performed in order to save costs of port docking, in case of emergency, or the like. As another example, in case the image captures a location that is near to a port or channel, and depicts one or more small tugboats positioned adjacently to a larger vessel that matches the missing vessel's type, the event may be classified as a logistics event of entering or exiting the port. In some cases, tugboats or pilot boats may be set to assist vessels in grounding events, collision events, or the like. As another example, in case the image depicts one or more small cargo boats positioned adjacently to a larger vessel, and the larger vessel is not estimated to be able to enter a nearby port such as due to the vessel being too heavy to enter a shallow port, the event may be classified as a cargo-to-cargo event, during which cargo is transferred from the larger vessel to the smaller vessels and the larger vessel is not configured to enter the port at all. In some cases, cargo-to-cargo events may occur in the midst of the ocean, such as remotely of any port, outside port area, or the like. In some cases, in case a depicted vessel in the image comprises a bunkering vessel, or in case the missing vessel comprises a bunkering vessel, the event associated with the image may not be classified as a cargo-to-cargo event, e.g., since bunkering ships may be considered as unlikely to be used for cargo.

In some exemplary embodiments, a verified maritime event may comprise a dark activity or an unintentional meeting with a sanctioned entity. A classifier may be configured to classify the verified event as an unintentional event that occurred unintentionally, or as an intentional event (e.g., dark activity), e.g., based on the classified type of event. In some exemplary embodiments, a probability that the maritime event comprises a dark activity may be determined based on an estimated type of event thereof, a context such as a time duration of the event, usual traffic or usage of the location, a last time of refueling of the disappearing ship, a ship history of the disappearing ship, a time duration of the event, or the like. For example, in case a vessel participating in a bunkering event near a sanctioned country during an AIS shutdown in the midst of the ocean for an unusually long duration, e.g., above a time threshold, this may indicate that illicit actions are taking place such as transferring people or weapons in addition to or instead of fueling. However, in case the vessel did not obtain fuel for a long period of time and was in an isolated place with no signal reception, the STS meeting may be classified as unintentional.

In some exemplary embodiments, a User Interface (UI) may present an overall estimation that a dark activity occurred, verified activities that were performed by the ship during the shutdown period, data regarding the verified activities such as images thereof, duration thereof, participants, or the like, estimated paths and maritime events that were or were not verified, or the like. In the UI, a presentation layer may enable a user to identify the geographical zone of the vessel, to identify, for each port in the geographical zone of the vessel, whether or not the vessel could have utilized the port, an estimated path of the vessel in case it visited the port, one or more possible timeframes of such as visit, or the like. In some exemplary embodiments, the possible timeframe may depend on the path to the port, the availability of the port, or the like.

In some exemplary embodiments, the UI may notify registered users of any newly identified STS transfers that are suspected to comprise dark activities. In some exemplary embodiments, based on the estimation of the dark activity, the UI presentation may provide to the user or serve one or more suggestions, recommendations, or the like, such as a clearance recommendation for a vessel that is estimated to be legitimate, a recommendation to cut ties with suspected vessel that have verified dark activities, or the like, enabling users to receive immediate recommendations for any vessel of interest worldwide. In some exemplary embodiments, given a vessel's identifier, e.g., IMO, users may be provided with the degree of confidence that the vessel wasn't involved in dark activities such as sanctions-evasion behavior during a look-back period. The look-back period may define a temporal context for which clearance may be provided, such as a period including the last 6 months, the last 12 months, the last 24 months, or any other period, which may be analyzed for dark activities.

Another technical solution of the disclosed subject matter is to identify a dark activity by first scanning multiple images to identify image patterns of interest, and then combining the image-driven data with MS transmission data to identify missing vessels that may correspond to the images. In some exemplary embodiments, a large volume of images such as optical satellite images, drone images, aerial photos, or the like, may be scanned to identify patterns and objects such as a butterfly pattern, indicating STS activities, e.g., using computer vision methods, using heuristics, tip-and-cue techniques, or the like. A butterfly pattern may depict two or more ships in a static period while performing an STS activity. In some exemplary embodiments, upon identifying images of interest, properties and characteristics of the depicted ships may be extracted, to potentially identify their type, size, origin, or the like, which may enable to classify the type of STS activity and potential participants. In some exemplary embodiments, the STS activity may be classified to comprise a logistics event, a bunkering fuel event, a cargo-to-cargo event, or the like, e.g., based on the imagery properties.

In some exemplary embodiments, MS data may be analyzed to identify candidate vessels in the same geographical zone as the captured image, that have an indicated path that corresponds to the STS meeting. In some exemplary embodiments, in case AIS data regarding the STS event is missing, the maritime data may be analyzed to identify at least one shutdown event that occurred in a same timeframe in a wider geographical zone. In some exemplary embodiments, upon identifying one or more vessels that ceased to signal their AIS data for a timeframe that overpasses a shutdown threshold and matches the timestamp of the butterfly image, one or more candidate vessels involved in a ship-to-ship event may be identified.

For each candidate, at least one potential travel may be determined, e.g., based on a profile of the candidate, the duration of the shutdown event, or the like. In some exemplary embodiments, a potential travel may comprise feasible paths and destinations of the missing vessel during the shutdown period, such as based on a duration of the shutdown event, an official trajectory or destination of the ship, past behavior of the vessel, past behavior of other vessels in the same area, common maritime paths, a context of the shutdown event, AIS data from the vessel prior to and after the shutdown event (e.g., indicating a speed of the vessel), or the like.

Additionally, or alternatively, instead of analyzing images to identify patterns of interest, an anomality detector may be utilized to profile ships that are associated to an anomality such as an unusual AIS transmission pattern, an unusual image pattern, or the like. Upon identifying an anomality, an associated vessel may be tracked to identify shutdown events, dark activities, or the like.

One technical effect of the disclosed subject matter may be providing an accurate indications of a dark activity, based on identified shutdown events that are verified against image patterns. In some exemplary embodiments, potential travel paths with various probabilities may be generated to fill in the gap of data, which may be computed even when there are significant gaps in the raw maritime data relating to the vessel. The disclosed subject matter may provide unbiased, data-driven dark activity identifications that are based on contextual analysis of actual ship operations using classifiers, e.g., machine learning classifiers, artificial intelligent classifiers, heuristics classifiers, or the like. The analysis may be able to congest large volumes of data and automatically focus on relevant potential events, in contrast to naïve implementations which may require unrealistic computation resources, to process all available data.

Another technical effect may be mitigating the risk of undetected vessels that are involved in dark activities, by improved a tracking and identification of such activities, and providing a dark activity analysis automatically. The disclosed subject matter may enable to improve an organization's understanding of maritime risk, and enable the organization to better utilize its resources, and avoiding taking unnecessary risks.

Yet another technical effect may comprise verifying that a vessel has carried out a dark activity in a high level of certainty using active satellite imagery or RF transmissions. In some exemplary embodiments, the disclosed subject matter provides a verification in a timely manner, without consuming extensive resources and while minimizing interruptions.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a system, in accordance with some exemplary embodiments of the disclosed subject matter.

System 100 may be a computerized system comprising a Processor 101 and Memory 102. In some exemplary embodiments, Processor 101 may be a Central Processing Unit (CPU), a microprocessor, an electronic circuit, an Integrated Circuit (IC) or the like. Processor 101 may be utilized to perform computations required by the System 100 or any of its subcomponents. In some exemplary embodiments, Memory 102 may be a hard disk drive, a Flash disk, a Random Access Memory (RAM), a memory chip, or the like. In some exemplary embodiments, Memory 102 may comprise a short-term storage device, long-term storage device, a combination thereof, or the like. Memory 102 may comprise a persistent storage, a volatile storage, a combination thereof, or the like. Memory 102 may retain program code operative to cause the Processor 101 to perform acts associated with any of the subcomponents of System 100. Additionally or alternatively, Memory 102 may be used to retain databases, such as Maritime Database 115, or the like. Memory 102 may be used to retain or otherwise access raw maritime data, ship profiles, maritime maps, or the like. Memory 102 may retain program code operative to cause Processor 101 to perform acts associated with any of the steps in FIGS. 2, 3, or the like.

The components detailed below may be implemented as one or more sets of interrelated computer instructions, executed for example by Processor 101 or by another processor. The components may be arranged as one or more executable files, dynamic libraries, static libraries, methods, functions, services, or the like, programmed in any programming language and under any computing environment.

Memory 102 may comprise a Maritime Data Obtainer 110, which may be configured to obtain the raw maritime data, e.g., from Vessels 140 and 160, from a server, or the like. In some exemplary embodiments, the raw maritime data may be obtained from a plurality of different sources such as AIS data vendors, external databases, satellite-based maritime communications from Vessels 140 and 160, ground stations obtaining communications from Vessels 140 and 160, port database, or the like. A record or entry of the raw maritime data may comprise a geolocation of a maritime object, a timestamp thereof, its name, an identifier thereof (IMO, MMSI), call sign, a flag, a destination, a speed, a Speed Over Ground (SOG), true heading, or the like. For example, AIS data vendors may provide AIS blips received by its base stations, satellites and other mobile or stationary receivers. The raw maritime data obtained and produced by Obtainer 110 may be retained in a database, such as Maritime Database 115.

In some exemplary embodiments, Memory 102 may comprise an Events Filter 120, which may be configured to process the Maritime Database 115 and determine one or more shutdown events based thereon. Alternatively, Events Filter 120 may obtain indications of shutdown events from Maritime Database 115, from a server, a third party, or the like. In some exemplary embodiments, the shutdown events may be determined based on a temporal description of activities or paths related to a vessel, which may be generated based on its AIS transmissions, thereby providing a compact representation and abstraction of the raw maritime data or deductions based on such data for an underlying vessel. An activity may be a compact representation of a large volume of raw maritime data (e.g., AIS blips), enabling to represent hundreds and even thousands of AIS blips by a single activity, path, event, or the like. In some exemplary embodiments, the shutdown events may be determined by identifying a gap in time and location between ships that overpasses a threshold, as indicated in Maritime Database 115.

In some exemplary embodiments, Events Filter 120 may be configured to filter out events that are not potential dark activities, such as based on technical factors. In some exemplary embodiments, Events Filter 120 may filter out events that are not near sanctioned-related waters or entities, events with a duration that is not sufficient to perform a meaningful operation, shutdown events with a duration and traveled distance that form a straight line, or the like. In some exemplary embodiments, Events Filter 120 may filter out irrelevant events based on external data sources that are not provided by vessels, such as port information (e.g., port complexity to navigate in), weather information (e.g., wave height during the event), ship profiles (weight of certain ship types), or the like, which may or may not be retained in Maritime Database 115.

In some exemplary embodiments, Memory 102 may comprise a Travel Generator 130, which may be configured to obtain from Events Filter 120 indications of filtered shutdown event that are dark activities candidates. In some exemplary embodiments, Travel Generator 130 may be configured to generate, for each such event, one or more potential travel paths including estimated paths and events that may have been performed by the vessel during the disappearing period. In some exemplary embodiments, Travel Generator 130 may determine the travel paths based on a first route segment of the vessel prior to the shutdown event, a second route segment after the shutdown event, a destination of the vessel, past activities of the vessel, maritime paths or activities in the area that are widely used, or the like.

In some exemplary embodiments, each travel path determined by Travel Generator 130 may be configured to be coherent with the timeframe of the shutdown event, with a speed capability, weight and size of the vessel, with capabilities and availability timeslots of nearby ports, or the like. For example, in case a travel path comprises docking at a nearby port, Travel Generator 130 may verify that the port is capable to host the type of vessel, that the port has sufficient available space during the event, that the port is capable of hosting the type of the vessel, or the like. As another example, in case a travel path comprises performing an STS transfer with another ship, Travel Generator 130 may analyze the Maritime Database 115 or a list of shutdown events do identify a partner for the STS transfer, that performed a shutdown event in corresponding timeframe and area.

In some exemplary embodiments, Memory 102 may comprise an Image Verifier 135, which may verify the travel paths or events thereof against available images from the maritime area, e.g., satellite images. In some exemplary embodiments, as static events such as STS or port events may be easier to spot than non-static events such as traveling, Image Verifier 135 may focus on static events. In some exemplary embodiments, Image Verifier 135 may analyze images that were captures during the shutdown event, and were estimated to occur in a static period of the path, such as during an STS activity, a port docking, or the like. In some exemplary embodiments, in case Image Verifier 135 verifies a travel path segment, e.g., identifies that a ship of the same type of the missing vessel was identified performing an estimated activity of a travel path at an estimated time, Image Verifier 135 may indicate to Notifying Module 150 that a dark activity is estimated to be performed, details of the verified travel path, or the like.

In some exemplary embodiments, Memory 102 may comprise a Notifying Module 150, which may indicate to User 155 the estimated dark activity, the ship's identifier, properties of the estimated dark activity, or the like, thus enabling User 155 to prevent future cooperation with the vessel.

Figure 2:
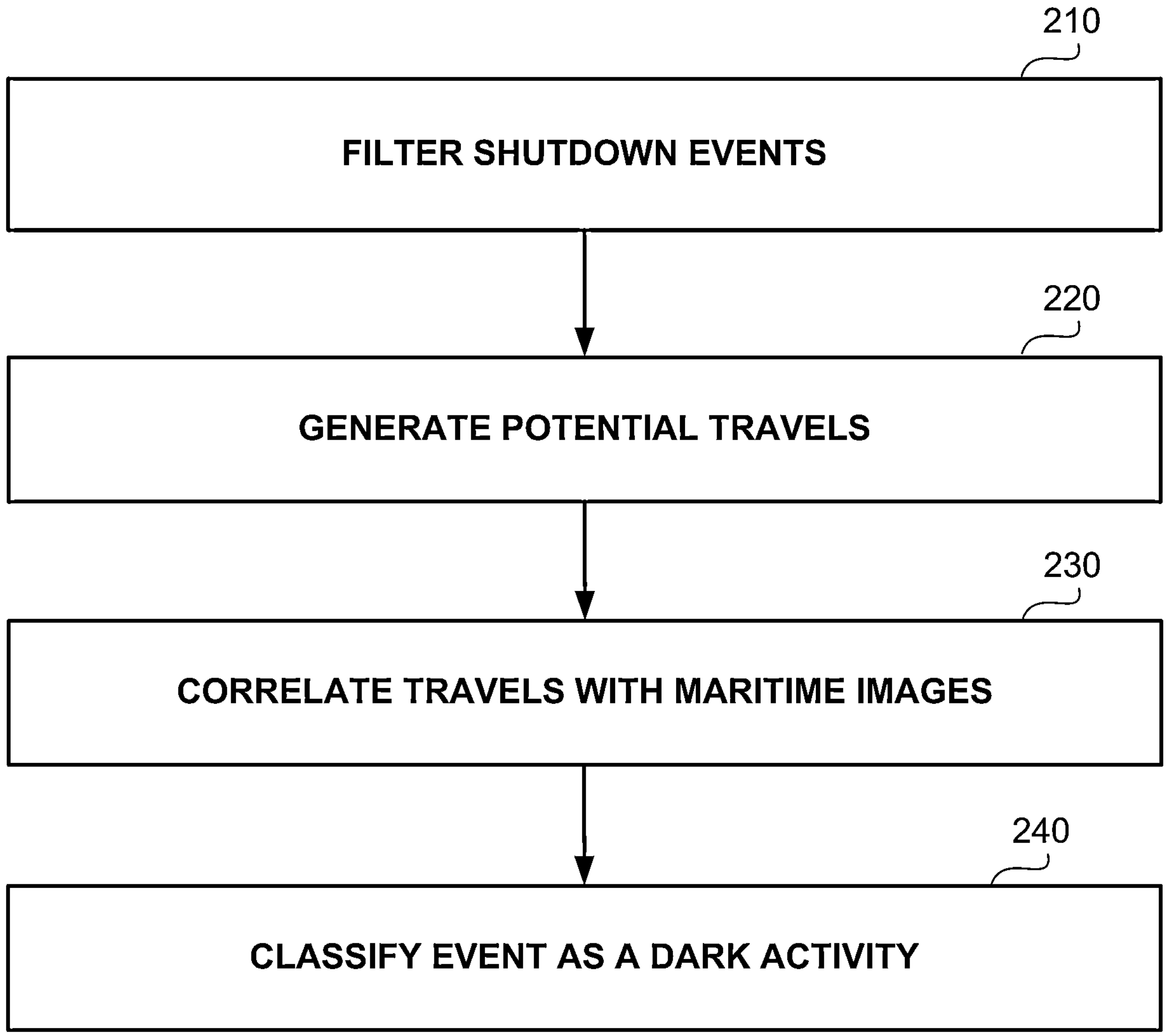
FIG. 2 illustrates a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, shutdown events may be filtered. In some exemplary embodiments raw maritime data may be obtained from a plurality of data sources, such as vendors of data, external databases, port database, agent's database, or the like. The raw maritime data may be obtained by Maritime Data Obtainer, such as 110 of FIG. 1. In some exemplary embodiments, one or more shutdown events of interest may be identified, e.g., by filtering out shutdown events that are not of interest, that are not potential dark activities, or the like. In some exemplary embodiments, a shutdown event may comprise a loss of signal from a vessel, e.g., which is not currently in progress, for more than a defined timeframe such as 2 hours, 8 hours, or the like. In some exemplary embodiments, a plurality of shutdown events may be identifying by processing the raw maritime data.

In some exemplary embodiments, the plurality of shutdown events may be analyzed to extract therefrom events that may indicate a dark activity such as illicit transfers, sanction evasion activities, or the like. In some exemplary embodiments, since mere cessation of AIS transmissions may have multiple innocent explanations, it may be necessary to filter shutdown events that have a low probability (e.g., zero probability) of performing dark activities, for example, a probability below a determined or user-set threshold. In some exemplary embodiments, the shutdown events may comprise non-real-time event that are not in progress and have been completed prior to the processing thereof. In some exemplary embodiments, the shutdown events may be analyzed to identify whether it could have hidden a loitering activity in territorial waters of a sanctioned country for a minimal timeframe such as two hours, or any other threshold. In some exemplary embodiments, it may be desired to identify whether the shutdown event could have hidden a port call in a sanctioned country for a minimal timeframe such as twenty-four hours, or any other threshold. In some exemplary embodiments, it may be desired to identify whether the shutdown could have hidden an STS transfer with a sanctioned ship.

In some exemplary embodiments, the shutdown events may be filtered according to their duration, calculations derived from initial and later path segments of the missing vessel before and after the shutdown event, or the like. In some exemplary embodiments, a shutdown event that has a duration which is not sufficient to perform an activity of interest, such as docking or performing STS transfer, may indicate that the shutdown event is not of interest, should be filtered out, is unintentional, or the like. In some exemplary embodiments, filtering may be performed to identify and filter out non-suspicious patterns such as vessels being in areas that are clear of sanctioned entities or waters during the shutdown event, vessels progressing during the shutdown event a distance that corresponds to the duration of the event, the average speed of the vessel before the event, the weather, or the like. In some exemplary embodiments, non-suspicious patterns of events may comprise identifying vessels progressing, during the shutdown event, to a direction or path that are widely used, that make sense economically, that correspond to a direction of the reported destination, or the like. In some exemplary embodiments, shutdown events that correspond to non-suspicious patterns may not be further analyzed.

In some exemplary embodiments, in case a distance from the disappearing point of the vessel to the re-appearing point matches an average speed of the vessel and the event duration, the event may be filtered out. In some cases, the time elapsed between the disappearing and the re-appearing points may be compared to an estimated time to travel over a virtual line indicating a route between the points, a straight line between the points, a commonly used route, or the like, based on historic speeds of the vessel. In case the time difference or ratio difference is substantial, e.g., above a threshold, this may indicate that the shutdown event was intentional and the AIS transceivers were deliberately turned off, causing the event to not be filtered out and to remain for a further analysis, e.g., of Step 220. In some exemplary embodiments, the estimated time to travel over the line may be determined based on averaged speeds of the vessel before the disappearing, after the re-appearing, a combination thereof, or the like, based on averaged historic speeds of crossing the geographical area by multiple vessels, based on speed capabilities of the ship, or the like. In case a ship disappears and re-appears in a location that matches an estimated speed and distance of the vessel, a generated virtual line may between the disappearing and the re-appearing points may correspond to the duration of the event, indicating that the shutdown event may be unintentional, and the event should be filtered out.

In some exemplary embodiments, suspicious patterns of a shutdown event may cause the event to not be filtered out, and remain for further analysis. In some exemplary embodiments, suspicious patterns may be identified such as vessels being near sanctioned vessels in a timeframe that is adjacent to the shutdown event, vessels progressing a short distance during the shutdown event that does not correspond to the duration of the event or to the measured weather, vessels progressing during the shutdown event to a direction that does not make sense economically or does not correspond to a direction of the reported destination, historic behavior of the vessel that is suspicious such as not reporting AIS information in the last month for more than an hour, flag changes, or the like. In some exemplary embodiments, identifying that a shutdown event is suspicious and should not be filtered out be determined based on a geography factor, indicating whether or not AIS transmissions (or any other maritime transmission) from the missing vessel was interrupted in suspicious waters, such as territorial waters of a sanctioned country. In some exemplary embodiments, identifying that a shutdown event is suspicious may be determined based on historic behavioral patterns of the missing vessel, such as whether or not the flag of name of the vessel were used historically for a long period of time or whether the vessel's operations and status have been recently changed, that the vessel's name has changed for no known or apparent reason, or the like. In some exemplary embodiments, identifying that a shutdown event is suspicious may be determined based on a common operations of similar vessels in the region of the disappearing vessel, e.g., indicating whether or not the signal loss occurs often in the area, whether or not the missing distance and timeframe match a typical distance and timeframe of other ships, or the like. In some exemplary embodiments, identifying that a shutdown event is suspicious may be determined based on the behaviors of other vessels that belong to a same fleet or are operated by a same entity, in case such vessels exist. In some exemplary embodiments, identifying that a shutdown event is suspicious may be determined based on identifying a handshake between the vessel and another ship after the shutdown event, such as via RF communications. In some exemplary embodiments, intentional shutdown events may be probable in case a shutdown event was performed by two or more vessels in a similar area for a corresponding or partially overlapping timeframe. In some exemplary embodiments, any suspicious pattern of an event may be retained in a separate file, in additional fields of the event's records, or the like, and may affect a probability of performing a dark activity.

In some exemplary embodiments, a classifier that may be configured to classify the shutdown events according to a probability of performing a dark activity, e.g., based on a context of the candidate vessels, a probability threshold, or the like. In some exemplary embodiments, the classifier may comprise a machine learning classifier, an anomality detector, a heuristics-based classifier, a deep learning classifier, a data-driven classifier, a heuristics-based classifier, or the like. In some exemplary embodiments, in some cases, the classifier may be configured to classify the intention of the shutdown event, and filter out the shutdown event in case the event is classified as unintentional. Events may be classified based on a level of congestion in the area of the vessel. For example, in case a level of isolation or congestion of the vessel indicates that signal loss is probable, the event may be classified as unintentional and filtered out. In some cases, a vessel positioned in an isolated area or in an area with known communication issues may have an increased chance of unintentional signal loss, which may affect the dark activity probability. In some exemplary embodiments, in some cases, the classifier may be configured to filter out shutdown events in case their probability is below a threshold.

In some exemplary embodiments, the classifier may utilize historic data associated with the geographical zone to identify an anomality or a variation from the common behavior in the geographical zone of the event, e.g., which may indicate an intentional event, and vice versa. In some exemplary embodiments, the classifier may utilize traffic trends associated with the timeframe of the shutdown event in order to identify variations therefrom. For example, in case that a signal loss occurred in Valentine's day, which may correspond to high congestion trends, the shutdown event may be classified with an increased probability of being unintentional. In some cases, a vessel positioned in a crowded area with multiple nearby vessels may have an increased chance of unintentional signal loss. In some exemplary embodiments, the classifier may estimate an intention of a shutdown event based on whether the event occurred for a vessel that reported a destination to which it did not arrive. In some exemplary embodiments, the classifier may estimate an intention of a shutdown event based on the context of the event, based on a ship history of the disappearing ship, a time duration of the event, incident data, coverage data, congestion levels of traffic, reception issues, suspicious patterns, unsuspicious patterns, or the like.

In some exemplary embodiments, the classifier may filter out events according to one or more algorithms. In some exemplary embodiments, an algorithm may be configured to filter out irrelevant events that did not occur in suspicious locations, that did not occur near vessels of sanctioned entities, or the like. In some exemplary embodiments, the algorithm may obtain indications of one or more shutdown events as an input, and process them to determine which ones should be filtered out. In some exemplary embodiments, the algorithm may select to retain identified shutdown events that started and ended in ports of interest such as sanctioned ports, shutdown events that started and ended in sanctioned countries or territorial waters thereof, events that started and ended in PWA, shutdown events that started in a sanctioned port and ended in PWA, shutdown events that started in PWA and ended in a sanctioned port, or the like.

In some exemplary embodiments, the selected shutdown events, remaining after the initial filtering, may be further analyzed by the algorithm. In some exemplary embodiments, one or more parameters and values thereof may be determined, calculated, or the like. In some exemplary embodiments, a Speed Over Ground (SOG) of a missing vessel (referred to as 'calc_sog') may be computed, calculated, defined, or the like. In some exemplary embodiments, calc_sog may indicate a theoretical or estimated speed of the vessel in case the vessel traveled directly from the disappearing point to the re-appearing point during the event. In some exemplary embodiments, calc_sog may be determined as follows:

$$calc\_sog=missing\_distance/missing\_duration \quad (1)$$

wherein missing_distance denotes a distance between the point of disappearance to the point or re-appearance of the vessel, along a straight line or along commonly used routes, and missing_duration denotes a duration of the shutdown event.

In some exemplary embodiments, a speed ratio between the lost SOG (referred to as 'ratio_lost_sog') may be computed, calculated, determined, or the like. In some exemplary embodiments, ratio_lost_sog may indicate a ratio or relation between a speed of the vessel prior to the event (referred to as 'first_sog') and during the event, in case the vessel traveled directly from the disappearing point to the re-appearing point. In some exemplary embodiments, ratio_lost_sog may be determined as follows:

$$ratio\_lost\_sog=abs(first\_sog-calc\_sog)/first\_sog \quad (2)$$

In some exemplary embodiments, a ratio of the found SOG (referred to as 'ratio_found_sog') may be computed, calculated, determined, or the like. In some exemplary embodiments, ratio_found_sog may indicate a ratio or relation between a speed of the vessel after to the event (referred to as 'last_sog') and during the event, in case the vessel continued to travel as usual. In some exemplary embodiments, ratio_found_sog may be determined as follows:

$$ratio\_found\_sog=abs(last\_sog-calc\_sog)/last\_sog \quad (3)$$

In some exemplary embodiments, unaccounted hours (referred to as 'unaccounted_hours') of the event may be computed, calculated, determined, or the like. In some exemplary embodiments, unaccounted_hours may indicate a number of hours that were unaccounted, during which dark activities could have potentially taken place. In some exemplary embodiments, unaccounted_hours may be determined as follows:

$$unaccounted\_hours=missing\_duration-(missing\_distance/first\_sog) \quad (4)$$

Alternatively, unaccounted_hours may be determined as follows:

$$unaccounted\_hours=missing\_duration-(missing\_distance/last\_sog) \quad (5)$$

Equation (5) may be used, for example, in case the lost blip is zero and the found blip is greater than zero.

In some exemplary embodiments, after the initial calculations are performed, the calculated parameter values may be utilized to perform further filtering of events. In some exemplary embodiments, calculated values may be compared to one or more predefined thresholds. In some exemplary embodiments, the thresholds may be set manually by a user or operator, determined automatically based on benchmark data, or the like, with values that are configured to estimate whether the event is technically capable of being a dark activity. In some exemplary embodiments, a threshold classifier may be configured to set an optimal threshold for each condition, ensuring that dark activities are not filtered out and that unintentional events are filtered in a majority of cases. In some exemplary embodiments, the thresholds may be adjusted in real time, such as by the threshold classifier, a human operator, or the like.

In some exemplary embodiments, a first exemplary condition may be configured to ensure that a distance between the point of disappearance to the point or re-appearance of the vessel is sufficiently large to indicate that dark activity or any other activity has possibly occurred. For example, in case the distance between the point of disappearance to the point or re-appearance is extremely small, e.g., less than a defined distance such as 2 nautical miles, 1 nautical mile, 0.5 nautical miles, or the like, this may indicate that the ship is static and did not move at all during the shutdown event, the distance being a result of drifting, noisy data, or inaccurate measurement. In some exemplary embodiments, in case an automatic threshold classifier is used, the threshold classifier may be configured to set the threshold to a value that is estimated to separate between ships in a static state and moving ships that can perform maritime activities. In some exemplary embodiments, the first condition may be formally represented, for an exemplary distance threshold (TH1), as follows:

$$\text{Condition 1: } missing\_distance>TH1 \text{ nautical mile [nm]} \quad (6)$$

In some exemplary embodiments, events that do not comply with the first condition may or may not be filtered out and may not be further analyzed. Additionally, or alternatively, compliance with a second condition may be inspected. In some exemplary embodiments, the second condition may be configured to identify whether the estimated speed of the vessel during the event corresponds to the speed of the vessel prior to the event or after the event. In case the ratio between the estimated speed of the vessel during the event and the speed of the vessel prior to the event or thereafter, the associated ratio_found_sog or ratio_lost_sog, is very small, e.g., a ratio of less than 0.2, 0.3, 0.4, 0.5 or any other threshold, the event may be filtered out. In case the ratio is large, e.g., a ratio of more than 0.2, 0.3, 0.4, 0.5, or any other threshold, the event may be retained for further analysis.

For example, during an unintentional shutdown event, a vessel may increase its speed in an insignificant manner from 20 speed units to 25 speed units. According to this example, ratio_lost_sog may be determined to include a value of 0.25, which may be less than a speed threshold (TH2), e.g., since the difference in speed is not significant. In some exemplary embodiments, in case an automatic threshold classifier is used, the threshold classifier may be configured to set the speed threshold to a value that separates between significant speed modifications, indicating that a non-direct route was taken, and insignificant speed modifications that can occur during normal ship operation via a direct route. In some exemplary embodiments, the second condition may be formally represented, for an exemplary threshold (TH2), as follows:

$$\text{Condition 2: } ratio\_lost\_sog\geq TH2 \text{ OR } ratio\_found\_sog\geq TH2 \quad (7)$$

In some exemplary embodiments, shutdown events that do not comply with the second condition may or may not be filtered out and may not be further analyzed. In some exemplary embodiments, after ensuring the first and second conditions are complied with, compliance with a third condition may be inspected, examined, or the like. In some exemplary embodiments, the third condition may be configured to identify whether the unaccounted hours, during which dark activities could have taken place, comprise sufficient time to perform a meaningful action such as transferring cargo to or from a port or ship. In case the unaccounted hours are determined to comprise insufficient time to perform meaningful dark activities, e.g., comprise less than a time threshold of 10 hours, 8 hours, 5 hours, 2 hours, or any other time threshold representing any other time unit, the event may be filtered and may not be further analyzed. In some exemplary embodiments, the third condition may be formally represented, for an exemplary time threshold (TH3), as follows:

$$\text{Condition 3: unaccounted\_hours} > \text{TH3 [hours]} \quad (7)$$

In some exemplary embodiments, the remaining events, that complied with all three conditions, a portion thereof, or the like, may be further analyzed to identify suspicious indicators, properties or "red flags" thereof that may be indicative of a dark activity. In some exemplary embodiments, the remaining events may be analyzed to identify whether a reported destination or flag of the vessel has changed within a defined timeframe, e.g., 24 hours, 48 hours, a week, or the like, from the re-appearance of the vessel. In some exemplary embodiments, the remaining events may be analyzed to identify whether a reported draft or draught of the vessel has changed within a defined timeframe from the re-appearance of the vessel. In some exemplary embodiments, the remaining events may be analyzed to identify whether a reported Course Over Ground (COG) of the ship has changed after the event in a significant number of degrees, e.g., over a degree threshold, which may indicate that a U-turn has been performed. In some exemplary embodiments, the remaining events may be analyzed to identify whether a duration of the shutdown event was extensive, such as a duration of more than 50 hours, 100 hours, 200 hours, or the like, which may reduce the chance of unintentional shutdown to zero or near zero. In some exemplary embodiments, the remaining events may be analyzed to identify whether route segments prior to the shutdown event indicated an attempted STS meeting, such as by performing drifting with no speed, performing maneuvers that seem like an attempt to connect with a ship, or the like. In some exemplary embodiments, the identified properties or "red flags" of the shutdown events may be retained as binary indicators associated with a record of each event, as a metadata thereof, or the like.

In some exemplary embodiments, a classifier or scoring module may be configured to determine an overall score that is configured to balance determined suspicious indicators, such as based on a weight of each indicator, a hierarchy of intentions, heuristics, a score of each indicator, a determined relation between the indicators, or the like, and determine an overall probability indicating whether or not the event should be filtered. In some cases, determined indications and properties may indicate opposite probabilities. For example, a shutdown event that was performed with a duration of more than 50 hours, and a destination change less than 50 hours after the event, or 2-3 other indicators or dark activity properties that are fulfilled, may be considered to be a dark activity with a high probability, even if another indicator indicates that the event was legitimate. As another example, a shutdown event with a duration of more than 50 hours, and no other indications or dark activity properties that are fulfilled, may be considered to be a dark activity with a medium or low probability, which may or may not be filtered based on a filtering threshold.

On Step 220, potential travel paths may be generated for the events of interest. In some exemplary embodiments, events that remain after the filtering stage of Step 210, may be processed to generate potential travel paths thereof. In some exemplary embodiments, potential travel paths of a disappearing vessel may be generated, determined, or the like, to comprise one or more potential paths and maritime activities of the vessel. In some exemplary embodiments, each predicted event or activity may be allocated an estimated timestamp or time range. In some exemplary embodiments, potential maritime events such as STS activities may performed in any maritime location, such as in the midst of the ocean, near a port such as instead of docking therein, or the like, while port activities may only occur inside or near a port. In some exemplary embodiments, STS transfer activities may comprise the movement of cargo from one ship to another while at sea, which may or may not be illicit, criminal, or the like.

In some exemplary embodiments, the potential travel paths may be determined based on data regarding historic travel paths and events of the vessel, historic paths and events of multiple vessels in the same geographical zone, docking availability slots in ports that are within the geographical zone of the event, identification of shutdown events of an STS partner, parameters of the vessel such as speed that are captured by AIS signals from the vessel prior or after the event, properties or attributes of the event, data sources such as regarding the weather, or the like. In some exemplary embodiments, potential travel paths may be determined based on one or more predictors such as data-driven models, heuristics-based models, or the like. In some exemplary embodiments, in order to generate potential travel paths for an event, the speed and acceleration of the vessel may be assumed to be consistent, or to variate within a defined range, thereby creating a linear travel.

In some exemplary embodiments, the potential travel paths may be generated to comprise at least one maritime event including a port call or an STS transfer, e.g., including a potential dark activity. In some exemplary embodiments, the maritime event may be required to comply with data constraints regarding the event, the ship, and the port or second ship with which the transfer is performed. For example, a potential travel of a vessel to a nearby port may utilize a profile of the vessel to identify ship properties such as the ship's draft, size and weight, and may utilize metadata of the port to identify whether the port comprises sufficiently deep water or space that enable the vessel to dock inside the port, has available docking space, or the like, e.g., based on ocean weather data, port entry and exit data, or the like. In some cases, maritime maps may be used to extract ocean depth data, port location data, or the like. In case the data indicates that the ship cannot dock in the port, the potential travel may be removed, may be adjusted to remove or change the maritime event, or the like, so that it includes a maritime event that does not comprise docking at the unfeasible port.

In some cases, potential travel paths may be generated to comprise a port call in case the duration of the port call, including traveling thereto and therefrom, is compatible with the duration of the shutdown event, an average time of unloading cargo in the port, a current state of traffic in the port, or the like. In some exemplary embodiments, potential docking events may be identified by determining which ports are within the geographical zone of the vessel. In some exemplary embodiments, potential travel paths may be generated to comprise a port call in case the port is compatible to global parameters of the vessel such as the vessel type, weight, diameter, or the like, as well as local vessel parameters such as a port call history of the vessel. In some exemplary embodiments, a port call may be determined based on statistical data regarding historic time periods that it took to transfer cargo in each port. In some exemplary embodiments, for each such port within the geographical zone that is capable of hosting the vessel during the shutdown event, possible paths thereto may be determined alone or in combination with one or more additional port or STS events in the geographical zone. In some exemplary embodiments, for each such port, possible timeframes for traveling via the possible paths may be determined, such as based on the port's congestion level, the port's typical time for unloading or loading cargo, the port's ability to dock the ship type of the missing vessel, or the like. For example, in case a vessel is a heavy type of vessel that can only dock in deep water ports, and an examined port in the list of candidate ports is a shallow port, the mismatch may indicate that the vessel has not docked at the port.

In some cases, potential travel paths may be generated to comprise an STS event. In some exemplary embodiments, an STS event in a travel may be generated in case two corresponding shutdown events of respective ships, one of which being the missing vessel, are identified in a relatively small distance of each other, and the ships are determined to be technically enables to meet during the shutdown event, e.g., based on the speed capabilities of the ships, their distance, the weather conditions, or the like. In some exemplary embodiments, detecting two vessels turning off their AIS transmissions in close proximity and simultaneously may be indicative a possible sanctions-busting Ship-to-Ship transfer. In some exemplary embodiments, possible candidates for the STS event may be selected based on different factors such as historical behavior of the candidate, destination reporting, or the like. In some exemplary embodiments, in case one or both ships are sanctioned ships, belong to an owner that is associated with a sanctioned country or organization, or the like, the chance of an intentional dark STS activity between the ships may increase.

In some exemplary embodiments, one or more graphical presentations of the potential travel paths may be generated over a map. In some exemplary embodiments, a graphical presentation may provide an estimated timeframe and duration for each maritime event, a probability score of each travel, a potential travel for a selected port (in case visiting the port is feasible), or the like.

On Step 230, the generated travel paths may be correlated with maritime images. In some exemplary embodiments, one or more potential travel paths may be verified against optical satellite images, drone images, or the like. In some exemplary embodiments, potential travel paths that are determined, estimated, or the like, may be crossed or matched against imagery. In some exemplary embodiments, maritime events of a generated travel may be correlated with maritime images capturing the estimated area of the maritime event, a portion thereof, an area within the geographical zone of the vessel, or the like, during the estimated duration of the event. For example, an image may be selected to be used in case it was captured after an estimated start of the event and before an estimated termination of the maritime event. In some exemplary embodiments, a determined time window of the event may be matches against images based on the type of ship depicted in the image, determined meeting type, or the like.

In some exemplary embodiments, the images may be correlated against static maritime events that are estimated to comprise a static period, e.g., when docking inside or near a port, or while transferring goods during an STS activity, which may be easier to identify or spot in images. For example, in case a port call is estimated to take place at a specific period near a specific port, satellite, aerial, drone images, or the like depicting ships in the area near the port during the specific period may be utilized for data crossing.

In some exemplary embodiments, images may be scanned and classified to identify images depicting ships, and to identify properties of the depicted ships. In some exemplary embodiments, in order to verify whether or not a depicted image comprises the missing vessel, the image may be processed with one or more computer vision techniques to identify one or more vessels therein, and extract one or more attributes or characteristics of the depicted vessels. In some exemplary embodiments, the extracted characteristics may be matched against the vessel, e.g., a type thereof, a diameter thereof, profile information thereof, or the like. In some exemplary embodiments, a profile of a ship may be obtained, such as from a server, or generated, such as based on accumulated information relating to the ship movements over an extended period of time. In some exemplary embodiments, a database (DB) with ship profiles or any other maritime data may be retained, obtained, be accessible, or the like, e.g., at a server, a computing device, a backend of the system, or the like. For example, a ship profile in the database may comprise the ship's name, its global unique identifier, its internal unique identifier, a type thereof, a weight thereof, a structure thereof, a reported nationality of the ship, its official owners, features of ship, draft, capacity, structure, operator, past transactions (fuel, cargo, maintenance, ports used), information regarding an associated fleet, insurance information, other characteristics of the vessel, or the like.

In some exemplary embodiments, in case of an estimated STS event, images may be scanned to identify a butterfly shape or pattern which may correspond to an STS meetings, e.g., using one or more computer vision techniques, tip-and-cue techniques, or the like. In some cases, upon identifying an image depicting an STS meeting in a relevant location and time, the vessel attributes may be examined to identify whether one or the ships corresponds to the missing vessel, and whether the second vessel matches characteristics of a suspected vessel that performed a corresponding shutdown in overlapping times and areas, whether the second vessel is associated with a sanctioned entity, whether the second vessel reports a flag of a sanctioned country, or the like. In some exemplary embodiments, an identity of the second ship may be determined based on AIS data from the second ship, which may indicate a correlated shutdown event that is correlated with the first ship. In case the second ship did not perform a shutdown of AIS transmissions, an identity and path of the second ship may be determined based thereon. In some exemplary embodiments, in case multiple candidates for the second ship exist, candidates may be rated according to a probability rate, which may be based on various factors such as historical behavior of the candidate, a destination reporting of each candidate, candidate attributes extracted from image such as size, color, previous images of the vessel, or the like.

In some exemplary embodiments, in case of a port event, which may comprise identifying the ship waiting at the entrance of the port (e.g., in case of congestion or blocked view of the port) or docking within the port, images depicting the port, an entrance thereto, or the like, may be scanned using one or more computer vision techniques, tip-and-cue techniques, or the like. In case a port has a view blockage, such as a non-transparent roof, it may be impossible to obtain images from within the port, and images may be obtained from the entrance to the port instead.

In some exemplary embodiments, upon identifying an image verifying an estimated event, the travel timeline may be adjusted according to a timestamp of the image, the travel locations may be adjusted according to the location of the image, or the like, so that the accuracy of the travel is enhanced. In some exemplary embodiments, in case a travel that is verified contradicts a second travel that is not verified by imagery, the second travel may be removed, withdrawn, reduced to a zero probability, or the like. In some exemplary embodiments, in case an image of an estimated maritime event is not identified at all, the maritime event may not be considered to be verified. In some exemplary embodiments, potential travel paths that are at least partial verified by imagery (e.g., verifying one event thereof) may be remained, while potential travel paths that are not verified by images at all may be removed, or allocated a low probability ranking. In some exemplary embodiments, not finding an image at all may be different from finding an image of the maritime activity with a low resolution, unclear features, or the like, since finding an image at the area and time of the estimated maritime event that does not contradict the event and includes the butterfly pattern indicates a high probability that the estimated maritime event did occur, even if the type of ship or properties thereof cannot be extracted or cannot be used due to low resolution.

In some exemplary embodiments, based on one or more identified images that depict estimated maritime events or paths of a missing vessel during the shutdown event, the maritime events may be classified to one or more event types. In some exemplary embodiments, the depicted maritime event may be classified as a logistics event, a cargo-to-cargo event, or a maintenance event, all of which may or may not comprise dark activities with different or same probabilities, weights, or the like. In some exemplary embodiments, the depicted maritime event may be classified to an event type based on a ship class of participating vessels, a duration of the event, a commercial state, an official trajectory of each vessel, or the like.

In some exemplary embodiments, logistics events may be performed while entering or exiting a port. For example, in case the ship is near a port and is not able to dock inside the port without assistance, the ship may use a tugboat, a pilot boat, or the like, in order to enter the port safely. For example, the ship may be too heavy to enter a shallow portion of the port, thereby requiring small boats to assist the ship in or out the port. In some exemplary embodiments, logistics events may be identified in case the missing vessel comprises a relatively large ship, and images near the port that are captured during the shutdown event depict a butterfly pattern comprising the ship along one or more small tugboats.

In some exemplary embodiments, cargo-to-cargo events may comprise unloading or loading cargo with any vessel for any purpose, remotely from ports, near a port, or the like. In some cases, cargo-to-cargo events may include unloading cargo to one or more smaller cargo ships near a port, such as due to time limitations, technical limitations, or the like. In some exemplary embodiments, such cargo-to-cargo events may be identified in case images near a port that are captured during the shutdown event depict a butterfly pattern comprising a cargo ship (not a bunkering ship) that matches a profile of the vessel, along one or more small cargo ships. Alternatively, cargo-to-cargo events may be identified in case images remotely from a port depict a butterfly pattern comprising two cargo ships positioned adjacently to each other, both not comprising a bunkering ship or a maintenance facility.

In some exemplary embodiments, maintenance events may comprise performing maintenance operations such as an STS transfer with a floating shipyard such as a moveable maintenance facility, a bunkering vessel, or the like. A maintenance event may comprise, for example, a bunkering event during which the vessel may perform an STS transfer with a chemical tanker that may provide fuel to the vessel. In some exemplary embodiments, such maintenance events may be identified in case images near the estimated event, typically in deep waters, that are captured during the shutdown event depict a butterfly pattern comprising a ship that matches a profile of the vessel, along a large bunkering ship.

On Step 240, an overall probability that the shutdown event includes a dark activity may be determined, e.g., based on the classified event type, the event context, or the like. In some exemplary embodiments, data from different sources may be combined to predict or estimate whether a vessel took place in illegal activity. In some exemplary embodiments, in order for a shutdown event to be classified as a dark activity, it must comply with all the conditions of the filtering Step 210, indicating that the event is associated with a sanctioned or otherwise suspicious entity, that the event occurred for a sufficiently long duration, that the distance between the disappearing and the re-appearing points does not correspond to the average speed and duration of the event, or the like. In some exemplary embodiments, in order for a shutdown event to be classified as a dark activity, it must comprise a generated travel that was verified by at least one corresponding image, e.g., by Step 230.

In some exemplary embodiments, a verified event may be classified as a dark activity based on the classified event type, e.g., a logistics event, a cargo-to-cargo event, or a maintenance event, in combination with a context of the event. For example, a maintenance event may be determined to comprise a dark activity based on a last time of refueling of the disappearing ship, patterns of behavior or change of both vessels such as changing their reported destination, a number of "red flags" or suspicious patterns of the vessel (e.g., as determined by Step 210), or the like. For example, in case the missing vessel has refueled a short time prior to the maintenance event, the event may be determined to comprise a dark activity in a high level of certainty.

In some exemplary embodiments, upon determining that a dark activity occurred in a high level of certainty, one or more users such as registered users may be notified regarding this insight, automatically or in response to a request. For example, indications may be provided to users that are registered to any news regarding dark activities, to users that are registered to the specific ship that was involved in the dark activity, or the like.

Figure 3:
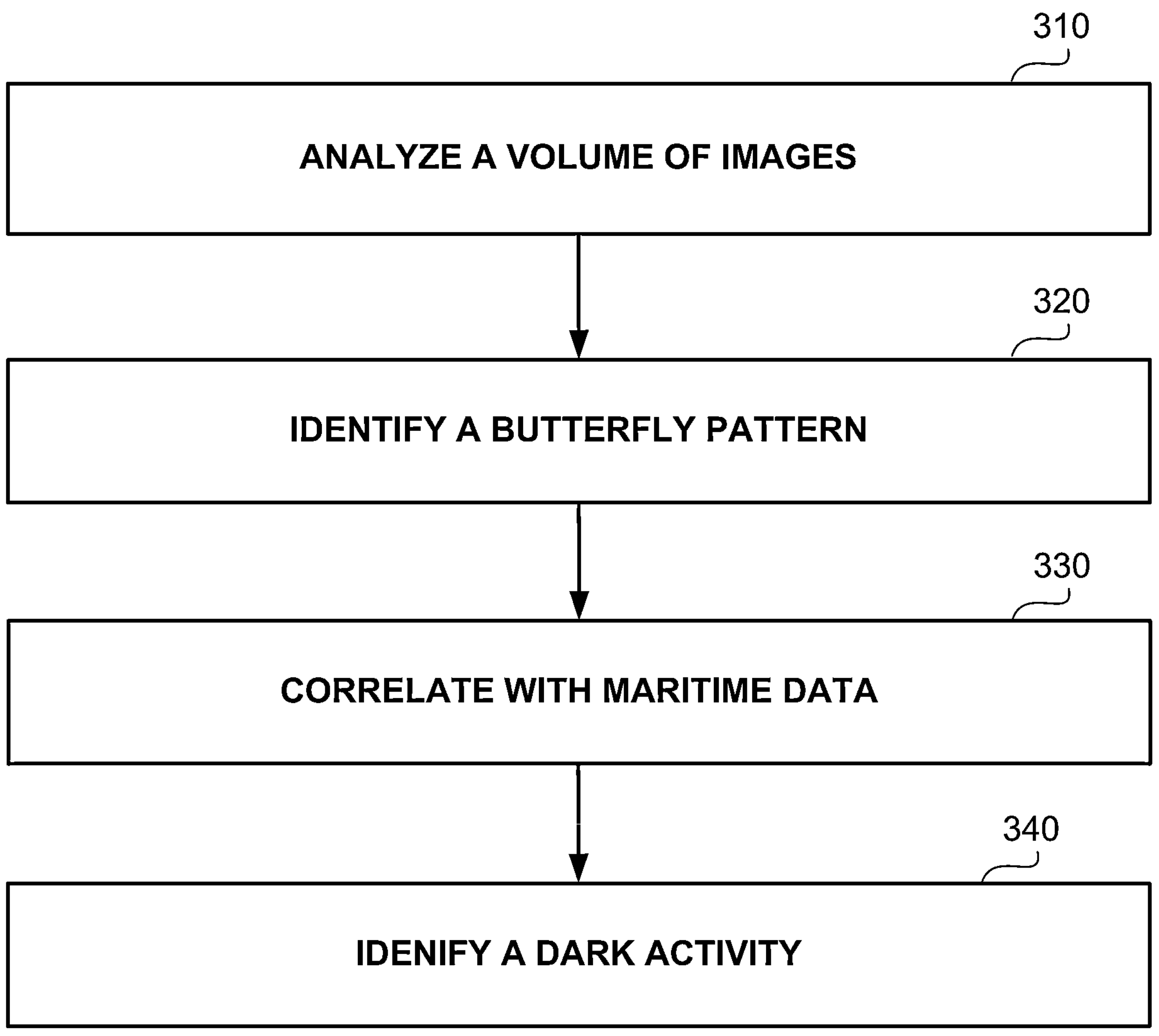
FIG. 3 illustrates a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, a volume of maritime images may be analyzed, e.g., in order to identify an STS meeting. In some exemplary embodiments, the volume of images may be processed using computer vision techniques, or any other techniques, to identify a butterfly-like pattern indicated an STS maritime transfer. In some exemplary embodiments, the images may comprise satellite images, drone images, or any maritime images.

On Step 320, a visual pattern in an image may be identified. As one example, the visual pattern may be a butterfly pattern, showing two vessels in tandem, side-by-side. The disclosed subject matter is explained through the use of such pattern, but the disclosed subject matter is not limited to such visual pattern, and additional patterns may be utilized. Upon identifying in the image, a graphical pattern of a butterfly, depicting two ships positioned alongside each other, such as via a longitude axis, relevant candidates for the meeting may be searched for.

On Step 330, the image may be correlated with maritime data, e.g., AIS transmissions, in order to identify vessel candidates. In some exemplary embodiments, the time during which the image was captured, its estimated location, or the like, may be matched against shutdown events that occurred in overlapping timeframes and geographical zones.

In some exemplary embodiments, upon identifying a corresponding shutdown event of a vessel, the vessel type and attributes may be matches against the image, to identify whether one of the depicted vessels matches the vessel type and attributes. In some exemplary embodiments, upon matching the image to a shutdown event, the identity of the vessel may be verified.

In some exemplary embodiments, the maritime event depicted in the image may be classified as a logistics event, a maintenance event, or a cargo-to-cargo event, based on the identity of the vessel and extracted attributes of the second vessel. For example, in case the second vessel is identified as a bunkering tank, the maritime event may be classified as a bunkering maintenance event.

On Step 340, a dark activity may be identified, e.g., based on the maritime event and one or more contexts of the maritime event.

Figure 4:
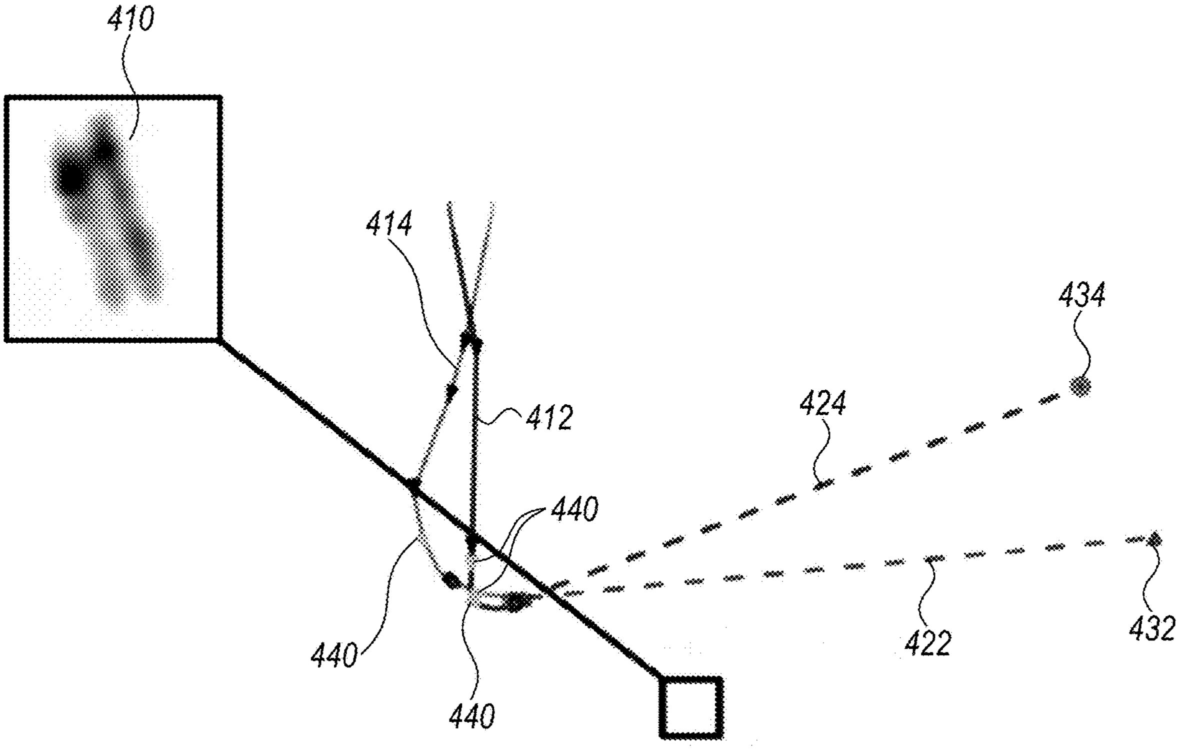
FIG. 4 shows a schematic illustration of an exemplary scenario, in accordance with some exemplary embodiments of the disclosed subject matter.

Referring now to FIG. 4 showing an exemplary dark activity, in accordance with some exemplary embodiments of the disclosed subject matter. In some exemplary embodiments, two vessels may incur a shutdown event at a same or similar time. In some exemplary embodiments, the shutdown events may be identified by a machine learning classifier detecting the vessels turning off their transmissions, a heuristics-based classifier, or the like.

In some exemplary embodiments, a detection of both vessels turning off their AIS transmissions in close proximity and simultaneously may constitute a strong indication of intentional shutdown in order to perform a dark activity, e.g., a possible sanctions-busting Ship-to-Ship transfer. In some exemplary embodiments, a first vessel may travel over a First Route Segment 412, until a transmission is ceased, and may re-appear in Position 432. In some exemplary embodiments, a second vessel may travel over a Second Route Segment 414, until a transmission is ceased, and may re-appear in Position 434.

As illustrated in FIG. 4, the First Route Segment 412 and the Second Route Segment 414 may both comprise Drifting Portions 440, in which the engines of the vessels are turned off to no speed, and the ships are enabled to drift with the waves. In some exemplary embodiments, Drifting Portions 440 may indicate that a Ship-to-Ship transfer is attempted to be performed. In some exemplary embodiments, an attempted dark activity may be identified prior to the shutdown event, such as based on Drifting Portions 440, patterns of the vessel's routes indicating an attempted Ship-to-Ship transfer, or the like. In some exemplary embodiments, in order to perform STS transfer, both participating vessels may perform a "courtship dance" including multiple adjustment paths of both ships during an attempt to position the vessels alongside each other, which may be used as an indication of an STS transfer prior to the shutdown event.

In some exemplary embodiments, a Distance 422 between a disappearing of the first vessel at the end of First Route Segment 412 and a re-appearing of the first vessel at Position 432 may be computer. In some exemplary embodiments, a Distance 424 between a disappearing of the second vessel at the end of Second Route Segment 414 and a re-appearing of the second vessel at Position 434 may be computed.

In some exemplary embodiments, for the first vessel, an average speed of the vessel, such as historically, during the First Route Segment 412, or the like, may be utilized to determine an estimated time for traveling over Distance 422. In some exemplary embodiments, the estimated time may be compared to an actual timeframe of the shutdown events, in order to identify a ratio therebetween, compare the difference to a threshold, or the like. In some exemplary embodiments, based on the ratio, the comparison, or the like, excess duration may be determined. In some exemplary embodiments, the same calculations may be performed with regards to the second vessel.

In some exemplary embodiments, in case the excess duration is sufficient to perform one or more dark activities, estimated travel paths of the vessels may be computed, generated, or the like, and verified against images, such as in order to provide a high level of certainty. In some exemplary embodiments, the verification process may utilize active satellite imagery such as DigitalGlobe™ imagery, Planet™ imagery, or the like. In some exemplary embodiments, the verification process may utilize RF transmissions such as by utilizing signal location data gathered by a satellite constellation. In some exemplary embodiments, the verification process may comprise scanning images, signal location data, or the like, that correspond to the time and geographical zone or location of the shutdown event, e.g., within a defined range from the route segments, the distances, the re-appearing points, or the like. In some exemplary embodiments, the verification process may search for a butterfly patter.

In some exemplary embodiments, based on the verification process, an optical satellite image such as Image 410 may be identified. Image 410 may depict an STS transfer that corresponds to the shutdown events of the first and second vessels, thereby verifying the dark activity. In some exemplary embodiments, upon positioning the vessels alongside each other, e.g., the longitude or latitude side of the ships being adjacent to each other, the vessels may form a butterfly shape, including a shape of two adjacent vessels, as illustrated in Image 410. As depicted in FIG. 4, the STS event has not occurred on a straight line between the appearing and disappearing points, e.g., near Distances 422 and 424.

In some exemplary embodiments, in case the maritime event is estimated to comprise a port event, such as docking in a nearby sanctioned port, identification of the attempted dark activity may be determined prior to the shutdown, such as based on drifting portions of the vessel's path, patterns of the vessel's routes indicating an attempted entrance to the port, movement pattern, or the like.

Figure 5:
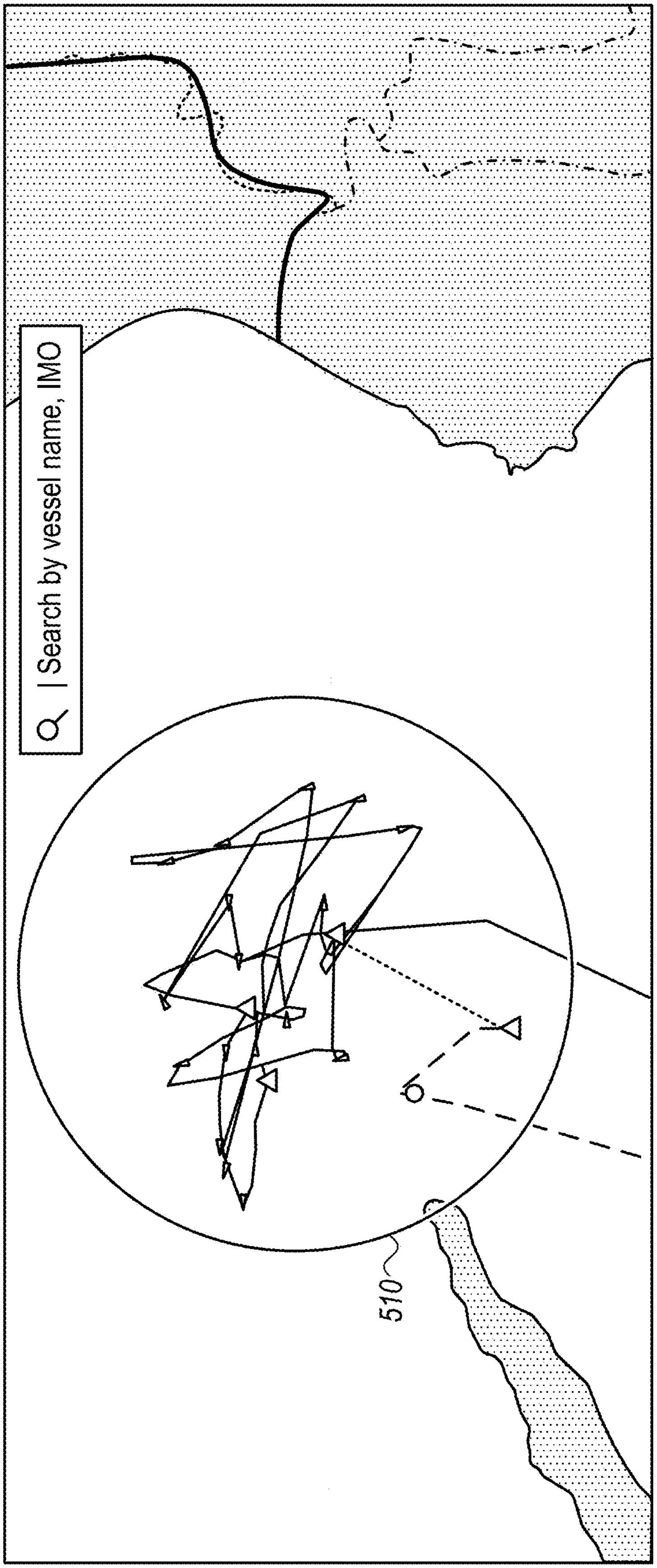
FIG. 5 shows a schematic illustration of an exemplary report, in accordance with some exemplary embodiments of the disclosed subject matter.

Referring now to FIG. 5 showing an exemplary dark activity scenario, in accordance with some exemplary embodiments of the disclosed subject matter. In some exemplary embodiments, in some cases, a disappearing vessel may perform an STS event with another ship that is transmitting AIS signals. In such scenarios, the STS event may be identified based on a Pattern 510 of a "courtship dance" of ships, which may be characterized with multiple attempts to coordinate a meeting. In some cases, both vessels may perform a shutdown event, but at least one of the vessel may cease to transmit AIS signals after performing a suspicious pattern such as the "courtship dance". Upon identifying that a vessel travels along a suspicious pattern such as Pattern 510, additional verifications may be performed to determine an estimated dark activity, e.g., verifying the vessel's travel against other AIS parameters, against satellite imagery, or the like. For example, in case a suspicious pattern such as Pattern 510 is traveled by a single ship, and a draft of the ship changes, e.g., from 14 meters to 8 meters, without traveling near a port, this may indicate that cargo has been provided from the signaling ship to a disappearing vessel during an STS activity.

Figure 6:
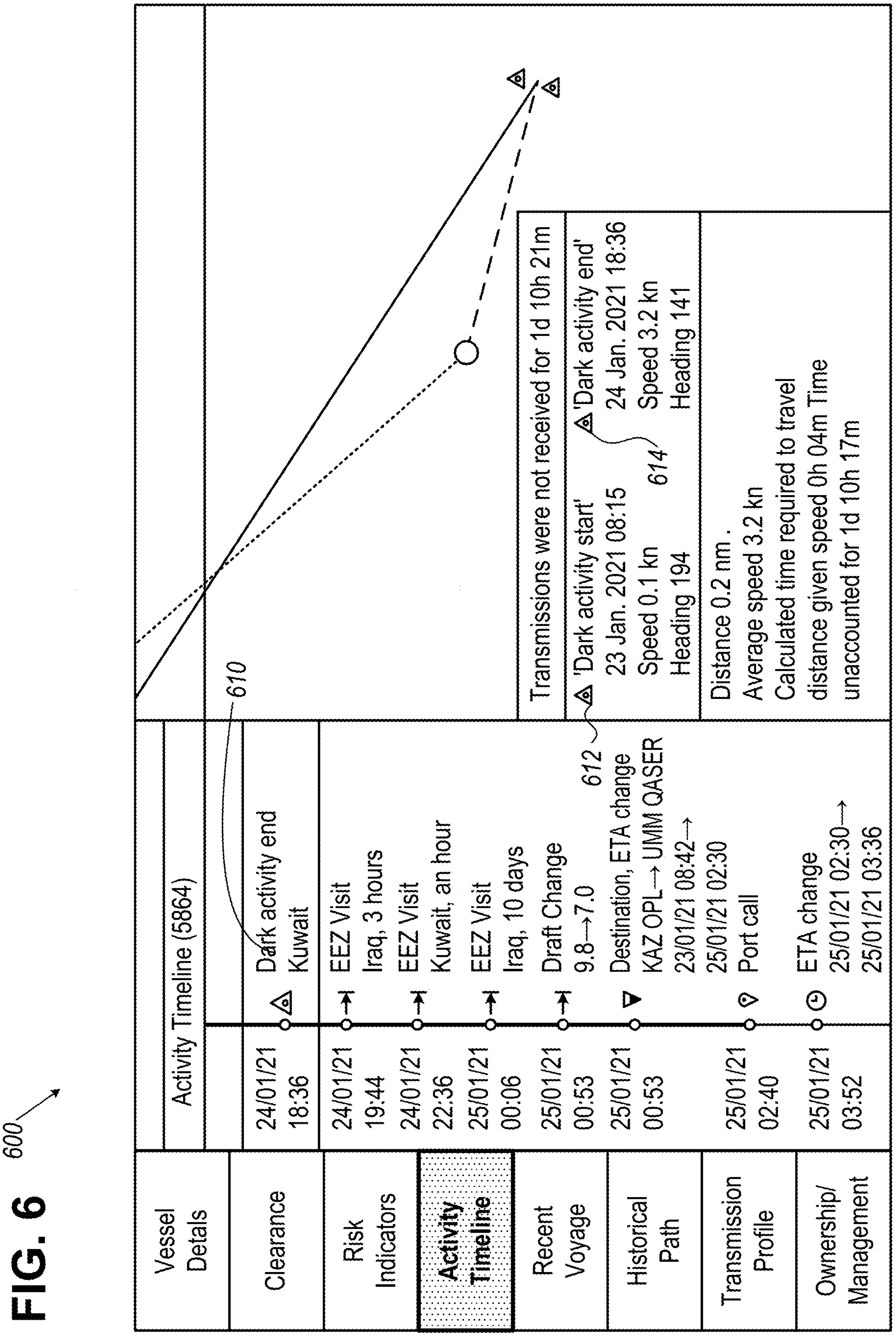
FIG. 6 shows a schematic illustration of an exemplary scenario, in accordance with some exemplary embodiments of the disclosed subject matter.

Referring now to FIG. 6 showing an exemplary dark activity scenario, in accordance with some exemplary embodiments of the disclosed subject matter.

In some exemplary embodiments, a user may be enabled to review one or more reports, activities, timelines, or the like, of a selected vessel. For example, the user may be presented with a user interface including vessel details (e.g., Profile 710 of FIG. 7), a clearance indication, risk indications that were identified, an activity timeline, a recent voyage of the vessel, historic paths traveled by the vessel, a transmission profile of the vessel, and a reported or estimated ownership of the vessel, management thereof, or the like.

In some exemplary embodiments, the timeline of a vessel may be generated to include identified activities of the ship, such as entrance to territorial waters of a country of interest, draft changes, shutdown events, or the like. Upon selecting a Shutdown Event 610, properties of the event may be presented to the user. In some cases, the properties may include a Start 612 of the shutdown activity, including a time when the signals were ceased, and properties of the ship as determined based on AIS signals that were received prior to the shutdown, e.g., a speed and heading of the vessel. In some cases, the properties may include an End 614 of the shutdown activity, including a time when the signals returned, and properties of the ship as determined based on AIS signals that were received at the end of the shutdown event, e.g., a speed and heading of the vessel after the shutdown event. Parameters that are derived from the Start 612 and End 614 parameters may also be presented to the user, such as a distance between the last reported location of the vessel prior to the shutdown event and the re-appearing location after the shutdown event, an average speed of the vessel prior to and after the event, an estimated time for traveling the distance with the average speed, and an estimated unaccountable timeframe during which the vessel could have performed a dark activity. Any additional or alternative parameters may be displayed to the user. In some cases, the determined parameters of the shutdown event may be visually depicted in a maritime map, such as by depicting path segments prior and after the shutdown event, and estimated paths or events during the shutdown event.

Referring now to FIG. 7 showing an exemplary report, in accordance with some exemplary embodiments of the disclosed subject matter.

As illustrated in FIG. 7, upon detecting a dark activity, a corresponding Report 700 may be generated for an involved vessel, for all involved vessels, a portion thereof, or the like. In some exemplary embodiments, Report 700 may comprise a Profile 710 of the vessel, which may comprise one or more fields such as the vessel's name, IMO, MMSI, call sign, flag, vessel class or type (e.g., Tanker), a sub-class of the vessel (e.g., crude oil tanker), a length of the vessel, a year of creation of the vessel, a draft of the vessel, a deadweight tonnage of the ship, or the like. Profile 710 may be generated based on transmissions from the vessel reporting properties thereof, accumulated data of the vessel that enables to interpolated additional profile fields, publicly available data that enabled to interpolated additional profile fields, or the like.

In some exemplary embodiments, Report 700 may comprise an estimated overall Risk 720 of the vessel which may indicate a probability that the ship performed illicit activity, sanction evasion activity, or the like, such as by performing Dark Activities 722 during which a transmission was ceased near suspicious areas, entities, or the like. Additional risk factors may comprise historic port calls performed by the vessel with sanctioned ports, anchoring or drifting near sanctioned areas or entities, meetings with unknown entities, identity manipulations of the vessel, being listed on sanctioned lists or registries, or the like. In some exemplary embodiments, Risk 720 of the vessel may comprise a risk score, such as a tier of the risk, a level of the risk, a risk probability, or the like. For example, Risk 720 may comprise a low risk, a medium risk, or a high risk. Alternatively, any other scoring method or hierarchy may be used.

In some exemplary embodiments, Report 700 may enable to list, for each activity, identified occurrences of the activity. For example, upon user selection of Dark Activities 722, automatically, or the like, Report 700 may provide a list of estimated or verified dark activities of the vessel that were identified near sanctioned entities, and included a shutdown event during which an STS event was verified using imagery, or the like. In some exemplary embodiments, properties of each estimated or verified dark activity may be provided, e.g., as depicted in FIG. 8.

Referring now to FIG. 8 showing an exemplary dark activity report, in accordance with some exemplary embodiments of the disclosed subject matter. In some exemplary embodiments, Report 800 may list or depict properties of an estimated or verified dark activity. In some exemplary embodiments, Report 800 may present a start time and end time of the shutdown event, a duration of the shutdown event, a context of the shutdown event such as a previously visited port, a next port that is scheduled to be visited, an official destination of the vessel, destination changes before and after the shutdown event, draft changes before and after the shutdown event, or the like. In some exemplary embodiments, Report 800 may present dark activity metrics such as an AIS coverage in the area, a distance between the disappearing point and the re-appearing point, an average speed of the vessel, an expected time to travel the distance using the average speed, an estimated duration of the dark activity (corresponding to the unaccountable hours of the vessel), or the like. In some exemplary embodiments, Report 800 may indicate possible port visits in a sanctioned country or area, possible STS activities with a sanctioned entity, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event;

identifying the shutdown event, wherein the shutdown event indicates that the vessel ceased to provide the location-reporting signals for a duration of the shutdown event;

determining a distance between the first geographical position and the second geographical position;

determining an estimated time to travel the distance based on the location-reporting signals of the vessel;

determining a geographical zone of the shutdown event based on the location-reporting signals of the vessel, the geographical zone defining a maximal distance to which the vessel can travel in any direction during the shutdown event;

comparing the estimated time to the duration of the shutdown event, to determine whether the vessel had sufficient time to perform a dark activity that is associated with a maritime event, wherein the maritime event comprises a port event or a Ship-To-Ship (STS) event;

in response to determining that the vessel had sufficient time to perform the dark activity, generating a potential travel path from the first geographical position to the second geographical position within the determined geographical zone, wherein the potential travel path comprises the maritime event;

obtaining images that correspond to the duration of the shutdown event and to the potential travel path; and verifying that the maritime event occurred based on an analysis of the images, wherein said analysis identifies the maritime event by identifying an object potentially representing the vessel in the images.

2. The method of claim 1 comprising determining that the maritime event comprises the STS event based on identifying a second shutdown event of a second vessel, wherein the second shutdown event has a second duration that overlaps at least partially with the duration of the shutdown event, wherein the second shutdown event has a second geographical zone that overlaps at least partially with the determined geographical zone of the shutdown event.

3. The method of claim 1 comprising determining that the maritime event comprises the port event based on identifying a port that is within the geographical zone of the shutdown event, wherein the port has sufficient resources to handle the vessel at a time of arrival of the vessel to the port according to the potential travel path.

4. The method of claim 1 comprising comparing the distance to a distance threshold, and determining, prior to said verifying, that the distance overpasses the distance threshold.

5. The method of claim 1, wherein the location-reporting signals comprise Automatic Identification System (AIS) transmissions from the vessel before and after the shutdown event.

6. The method of claim 1, wherein the potential travel path is generated based on at least one of:

historic data comprising multiple vessels' paths in the determined geographical zone of the shutdown event, and historic data regarding a behavior of the vessel.

7. The method of claim 1, wherein the maritime event comprises the port event, wherein the potential travel path is generated based on at least one of:

historic data regarding a port with which the port event is associated, and data regarding a state of the port during the shutdown event.

8. The method of claim 1, wherein the maritime event comprises the STS event, wherein the STS event is an event between the vessel and a second vessel, wherein the potential travel path is generated based location-reporting signals regarding the second vessel.

9. The method of claim 1, wherein the images are selected from a group consisting of:

satellite images;

drone images; and aerial images.

10. A computer program product comprising a non-transitory computer readable storage medium retaining program instructions, which program instructions when read by a processor, cause the processor to:

obtain location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event;

identify the shutdown event, wherein the shutdown event indicates that the vessel ceased to provide the location-reporting signals for a duration of the shutdown event;

determine a distance between the first geographical position and the second geographical position;

determine an estimated time to travel the distance based on the location-reporting signals of the vessel;

determine a geographical zone of the shutdown event based on the location-reporting signals of the vessel, the geographical zone defining a maximal distance to which the vessel can travel in any direction during the shutdown event;

compare the estimated time to the duration of the shutdown event, to determine whether the vessel had sufficient time to perform a dark activity that is associated with a maritime event, wherein the maritime event comprises a port event or a Ship-To-Ship (STS) event;

in response to determining that the vessel had sufficient time to perform the dark activity, generate a potential travel path from the first geographical position to the second geographical position within the determined geographical zone, wherein the potential travel path comprises the maritime event;

obtain images that correspond to the duration of the shutdown event and to the potential travel path; and verify that the maritime event occurred based on an analysis of the images, wherein said analysis identifies the maritime event by identifying an object potentially representing the vessel in the images.

11. The computer program product of claim 10, wherein the instructions, when read by the processor, cause the processor to determine that the maritime event comprises the STS event based on identifying a second shutdown event of a second vessel, wherein the second shutdown event has a second duration that overlaps at least partially with the duration of the shutdown event, wherein the second shutdown event has a second geographical zone that overlaps at least partially with the geographical zone of the shutdown event.

12. The computer program product of claim 10, wherein the instructions, when read by the processor, cause the processor to determine that the maritime event comprises the port event based on identifying a port that is within the geographical zone of the shutdown event, wherein the port has sufficient resources to handle the vessel at a time of arrival of the vessel to the port according to the potential travel path.

13. The computer program product of claim 10, wherein the location-reporting signals comprise Automatic Identification System (AIS) transmissions from the vessel before and after the shutdown event.

14. The computer program product of claim 10, wherein the potential travel path is generated based on at least one of:
historic data comprising multiple vessels' paths in the geographical zone of the shutdown event, and
historic data regarding a behavior of the vessel.

15. The computer program product of claim 10, wherein the maritime event comprises the port event, wherein the potential travel path is generated based on at least one of:
historic data regarding a port with which the port event is associated, and
data regarding a state of the port during the shutdown event.

16. The computer program product of claim 10, wherein the maritime event comprises the STS event, wherein the STS event is an event between the vessel and a second vessel, wherein the potential travel path is generated based location-reporting signals regarding the second vessel.

17. The computer program product of claim 10, wherein the images are selected from a group consisting of:
satellite images;
drone images; and
aerial images.

18. A system comprising a processor and coupled memory, the processor being adapted to:
obtain location-reporting signals of a vessel, wherein the location-reporting signals comprise a first signal and a second signal, wherein the first signal indicates that the vessel was located at a first geographical position prior to a shutdown event, wherein the second signal indicates that the vessel was located at a second geographical position after the shutdown event;
identify the shutdown event, wherein the shutdown event indicates that the vessel ceased to provide the location-reporting signals for a duration of the shutdown event;
determine a distance between the first geographical position and the second geographical position;
determine an estimated time to travel the distance based on the location-reporting signals of the vessel;
determining a geographical zone of the shutdown event based on the location-reporting signals of the vessel, the geographical zone defining a maximal distance to which the vessel can travel in any direction during the shutdown event;
compare the estimated time to the duration of the shutdown event, to determine whether the vessel had sufficient time to perform a dark activity that is associated with a maritime event, wherein the maritime event comprises a port event or a Ship-To-Ship (STS) event;
in response to determining that the vessel had sufficient time to perform the dark activity, generate a potential travel path from the first geographical position to the second geographical position within the determined geographical zone, wherein the potential travel path comprises the maritime event;
obtain images that correspond to the duration of the shutdown event and to the potential travel path; and
verify that the maritime event occurred based on an analysis of the images, wherein said analysis identifies the maritime event by identifying an object potentially representing the vessel in the images.

* * * * *